(12) United States Patent
Boardman

(10) Patent No.: US 11,889,826 B2
(45) Date of Patent: Feb. 6, 2024

(54) PIVOTING FISHING ROD

(71) Applicant: Dean Fredrick Boardman, Corner Brook (CA)

(72) Inventor: Dean Fredrick Boardman, Corner Brook (CA)

(*) Notice: Subject to any disclaimer, the term of this patent is extended or adjusted under 35 U.S.C. 154(b) by 169 days.

(21) Appl. No.: 17/250,700

(22) PCT Filed: Aug. 22, 2019

(86) PCT No.: PCT/CA2019/051158
§ 371 (c)(1),
(2) Date: Feb. 19, 2021

(87) PCT Pub. No.: WO2020/037426
PCT Pub. Date: Feb. 27, 2020

(65) Prior Publication Data
US 2021/0321598 A1   Oct. 21, 2021

Related U.S. Application Data

(60) Provisional application No. 62/720,954, filed on Aug. 22, 2018.

(51) Int. Cl.
*A01K 97/12* (2006.01)
*A01K 97/11* (2006.01)
(Continued)

(52) U.S. Cl.
CPC .............. *A01K 97/12* (2013.01); *A01K 97/01* (2013.01); *A01K 97/11* (2013.01); *A01K 87/00* (2013.01)

(58) Field of Classification Search
CPC ...... A01K 97/12; A01K 97/125; A01K 97/01; A01K 97/11; A01K 91/10
(Continued)

(56) References Cited

U.S. PATENT DOCUMENTS

| 693,071 A | * | 2/1902 | Ruud | ................... | A01K 97/11 |
|  |  |  |  |  | 43/15 |
| 1,451,124 A | * | 4/1923 | Stolze | ................... | A01K 97/01 |
|  |  |  |  |  | 43/16 |

(Continued)

FOREIGN PATENT DOCUMENTS

| CA | 1090571 A | * | 12/1980 | ............. A01K 97/01 |
| CA | 1149161 A | * | 7/1983 | ............. A01K 97/01 |

(Continued)

OTHER PUBLICATIONS

International Search Report and Written Opinion in PCT/CA2019/051158, dated Nov. 18, 2019.

*Primary Examiner* — Darren W Ark
(74) *Attorney, Agent, or Firm* — Knobbe Martens Olson & Bear LLP

(57) ABSTRACT

A pivoting fishing rod device including: a fishing rod frame pivotally coupled to a base arm on a rotational joint; the fishing rod frame comprising a rod arm and a support arm; rotation of the fishing rod frame relative to the base arm provided on an axis of rotation defined by the rotational joint, the rod arm coupled to the support arm so that the rotation of the rod arm and the support arm is co-dependent; a first resilient member coupled to a first attachment point mounted on the base arm and a second attachment point mounted on the support arm, the first resilient member configured to produce a tension counterbalance force as a distance between the first attachment point and the second attachment point increases. The first resilient member can apply the counterbalance force to the support arm providing a support vector to counterbalance a first load vector of a first load applied to the rod arm, the first load comprising a fishing line and hook hanging from the rod arm, the first load vector in a direction of the vector of gravity, the counterbalance force biasing the rod arm in a first range of angular (Continued)

position upon applying the first load and the counterbalance force allowing rotational motion of the rod arm in a second range of angular position upon applying a second load, the second load comprising a fish strike on the fishing line and hook.

20 Claims, 8 Drawing Sheets

(51) Int. Cl.
*A01K 97/01* (2006.01)
*A01K 87/00* (2006.01)
(58) Field of Classification Search
USPC .................................. 43/17, 15, 16
See application file for complete search history.

(56) References Cited

U.S. PATENT DOCUMENTS

| | | | | |
|---|---|---|---|---|
| 1,549,405 | A * | 8/1925 | Bjurstrom | A01K 91/10 43/15 |
| 2,008,482 | A * | 7/1935 | Wolf | A01K 91/10 43/15 |
| 2,114,529 | A * | 4/1938 | Goodhue | A01K 97/01 43/17 |
| 2,439,451 | A * | 4/1948 | Clark | A01K 97/01 43/17 |
| 2,502,231 | A * | 3/1950 | Oberg | A01K 97/01 43/17 |
| 2,624,972 | A * | 1/1953 | Burg | A01K 97/01 43/17 |
| 2,628,443 | A * | 2/1953 | Weckerling | A01K 97/01 43/15 |
| 2,638,696 | A * | 5/1953 | Derkovitz | A01K 97/10 43/15 |
| 2,657,494 | A * | 11/1953 | Brundage | A01K 97/01 43/17 |
| 2,693,046 | A * | 11/1954 | Langevin | A01K 97/01 43/17 |
| 2,803,912 | A * | 8/1957 | Kellar | A01K 97/01 43/16 |
| 2,955,374 | A * | 10/1960 | Matzo | A01K 97/01 43/16 |
| 2,977,704 | A * | 4/1961 | Tinsley | A01K 97/01 43/17 |
| 2,999,328 | A * | 9/1961 | Revord | A01K 97/01 43/17 |
| 3,163,954 | A * | 1/1965 | Westin | A01K 97/01 43/17 |
| 3,190,026 | A * | 6/1965 | Roszak | H03B 7/06 43/17 |
| 3,271,891 | A * | 9/1966 | Hancock | A01K 91/10 43/15 |
| 3,729,849 | A * | 5/1973 | Richard | A01K 97/12 43/17 |
| 3,807,078 | A * | 4/1974 | Bartys | A01K 97/01 43/17 |
| 3,888,035 | A * | 6/1975 | Totten | A01K 97/01 43/17 |
| 3,897,646 | A * | 8/1975 | Sheets | A01K 97/11 43/21.2 |
| 4,016,670 | A * | 4/1977 | Pihlaja | A01K 97/10 43/17 |
| 4,120,111 | A * | 10/1978 | Young, Jr. | A01K 97/01 43/17 |
| 4,373,287 | A * | 2/1983 | Grahl | A01K 97/01 43/17 |
| 4,492,053 | A * | 1/1985 | Poulin | A01K 97/11 43/15 |
| 4,567,686 | A * | 2/1986 | Akom | A01K 97/01 43/17 |
| 4,620,387 | A * | 11/1986 | Bloom | A01K 97/01 43/17 |
| 4,685,240 | A * | 8/1987 | Fralick | A01K 97/01 43/16 |
| 4,780,979 | A * | 11/1988 | Dyck | A01K 97/01 43/17 |
| 4,829,697 | A * | 5/1989 | Nakata | A01K 97/01 43/17.1 |
| 4,945,668 | A * | 8/1990 | Keller | A01K 97/01 43/17 |
| 4,993,182 | A * | 2/1991 | Monsen | A01K 97/01 43/17 |
| 5,050,333 | A * | 9/1991 | Debreczeni | A01K 97/10 43/16 |
| 5,067,269 | A | 11/1991 | Eppley et al. | |
| 5,107,614 | A * | 4/1992 | Gonnello | A01K 97/01 43/17 |
| 5,228,227 | A * | 7/1993 | Hodgson, Sr. | A01K 97/01 297/15 |
| 5,483,768 | A * | 1/1996 | Tessier | A01K 97/01 43/16 |
| 5,551,183 | A | 9/1996 | Solem | |
| 5,564,213 | A | 10/1996 | Rinehart | |
| 5,896,694 | A | 4/1999 | Midha | |
| 5,915,940 | A * | 6/1999 | Gross | A01K 97/01 43/17 |
| 5,992,080 | A * | 11/1999 | Allen | A01K 97/11 43/18.1 R |
| 6,088,945 | A * | 7/2000 | Sanderfoot | A01K 97/01 43/4.5 |
| 6,094,852 | A * | 8/2000 | Roach | A01K 97/12 43/16 |
| 6,564,496 | B2 | 5/2003 | Scherg | |
| 6,594,941 | B1 | 7/2003 | Anderson | |
| 6,622,421 | B1 * | 9/2003 | Daniels | A01K 97/01 43/4.5 |
| 7,992,341 | B1 | 8/2011 | Renstrom | |
| 8,453,371 | B1 * | 6/2013 | Sullivan | A01K 97/12 43/19.2 |
| 8,832,989 | B2 * | 9/2014 | Martinella | A01K 97/01 43/4.5 |
| 8,881,445 | B2 * | 11/2014 | Nolf | A01K 97/01 43/17 |
| 8,978,288 | B2 | 3/2015 | Olson et al. | |
| 9,095,130 | B2 | 8/2015 | Coulson | |
| 9,137,978 | B1 * | 9/2015 | Sullivan | A01K 97/10 |
| 2007/0169395 | A1 | 7/2007 | Rayfield | |
| 2009/0272022 | A1 | 11/2009 | Grega | |
| 2012/0291332 | A1 * | 11/2012 | Nolf | A01K 97/01 43/17 |
| 2014/0090287 | A1 | 4/2014 | Olson et al. | |

FOREIGN PATENT DOCUMENTS

| | | | | |
|---|---|---|---|---|
| CA | 1230485 | A * | 12/1987 | ............ A01K 97/01 |
| CA | 2242811 | A1 * | 8/1999 | ............ A01K 97/01 |
| CA | 2 484 511 | A1 | 5/2006 | |
| CA | 2532885 | A1 * | 7/2006 | ............ A01K 97/01 |
| CA | 2686005 | A1 * | 5/2011 | ........... A01K 91/065 |
| CA | 2688896 | C * | 5/2012 | |
| CA | 2759463 | A1 * | 5/2012 | ............ A01K 97/01 |
| CA | 2810890 | A1 * | 9/2013 | ............ A01K 97/01 |
| CA | 2880535 | A1 * | 7/2015 | ............ A01K 97/01 |
| EP | 0343713 | A1 | 11/1989 | |
| FR | 953196 | A * | 12/1949 | |
| FR | 1447713 | A * | 7/1966 | |
| FR | 2736799 | A1 * | 1/1997 | ............ A01K 89/08 |
| KR | 20020076580 | A * | 10/2002 | |
| SU | 1692467 | A1 * | 11/1991 | |
| SU | 1699395 | A1 * | 12/1991 | |
| SU | 1731132 | A1 * | 5/1992 | |

* cited by examiner

FIG. 1  FIG. 2  FIG. 3  FIG. 4
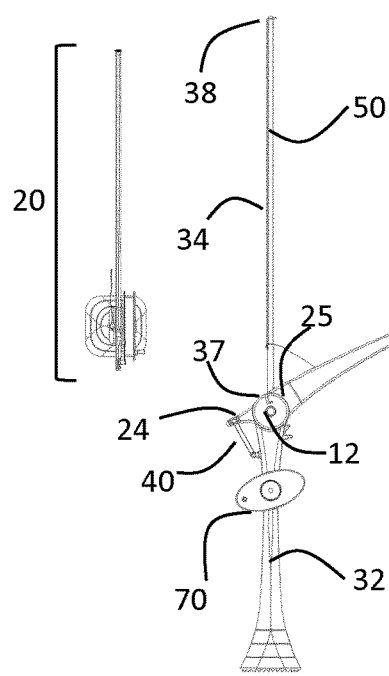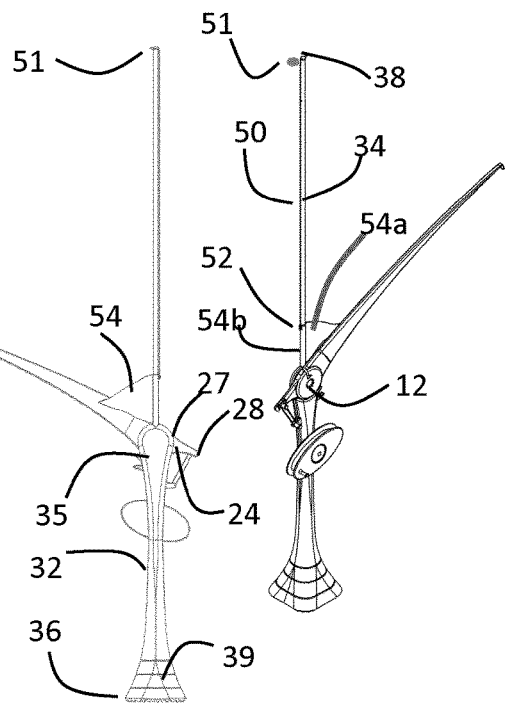
FIG. 5  FIG. 6  FIG. 7
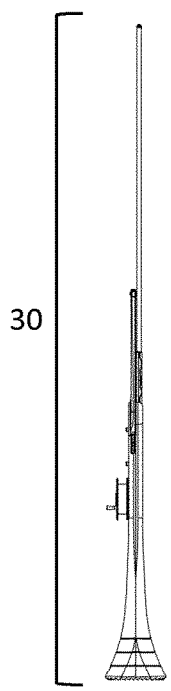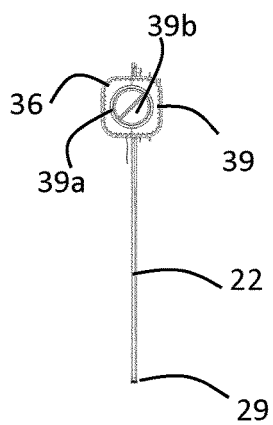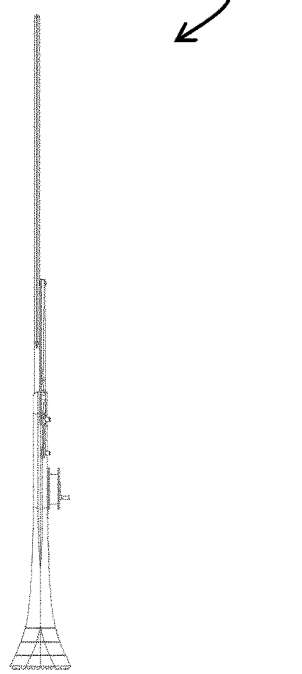

FIG. 17A
FIG. 17B
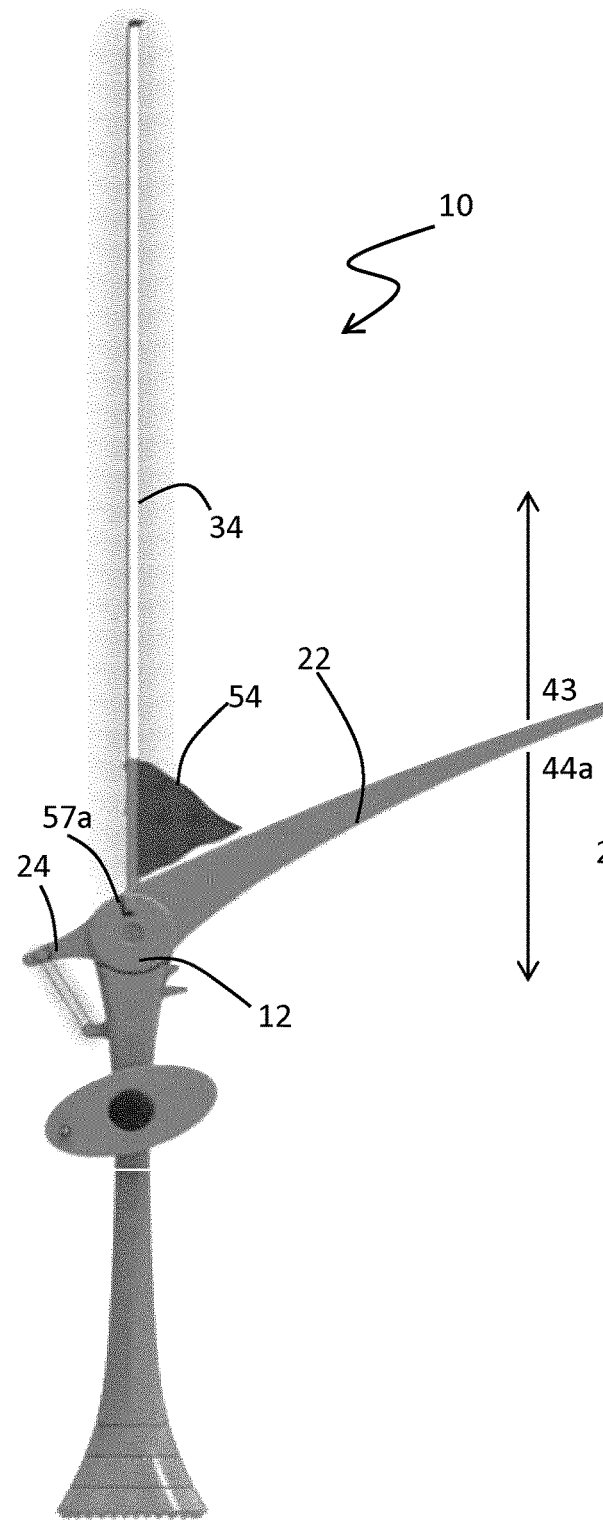
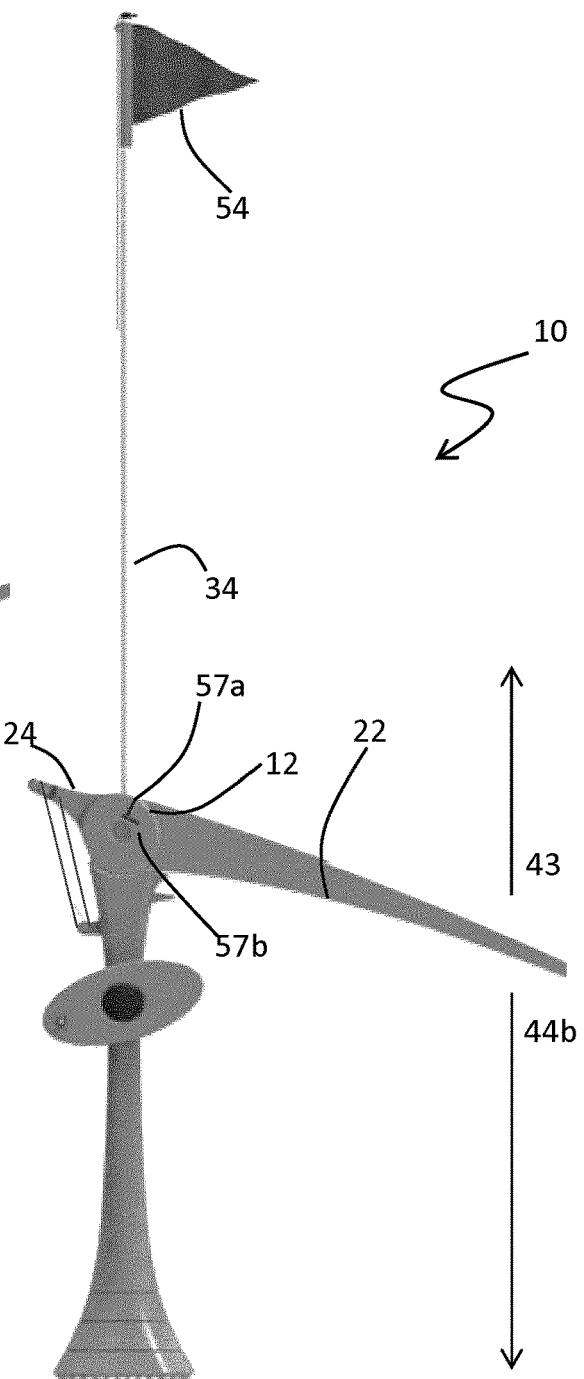

FIG. 22A
FIG. 22B
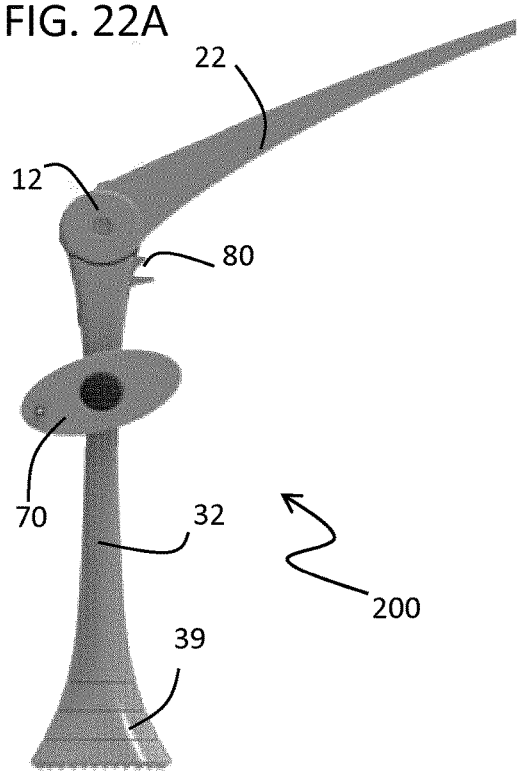
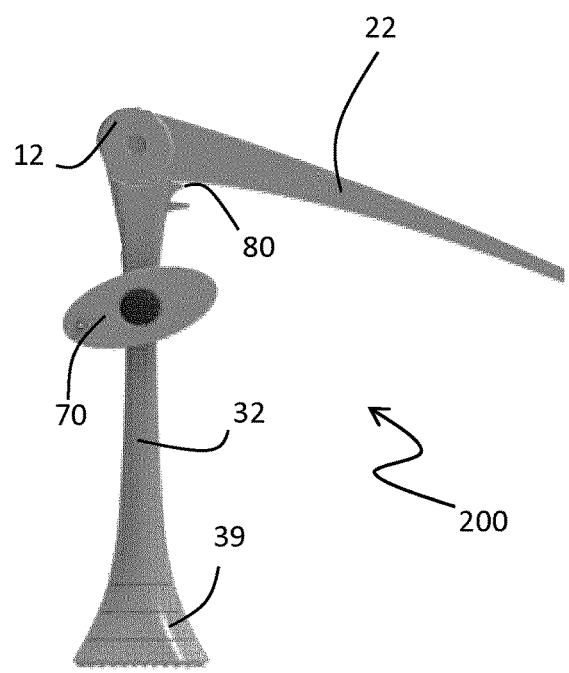
FIG. 23A FIG. 23B FIG. 24A FIG. 24B
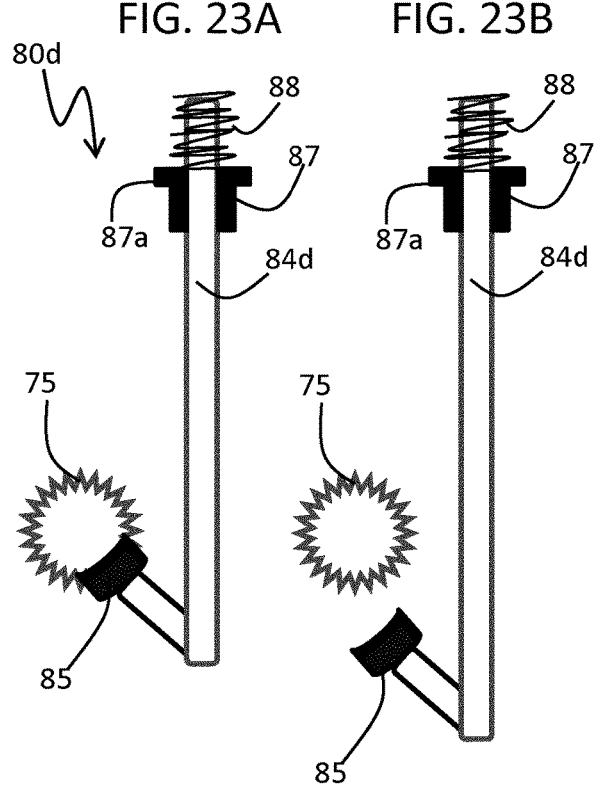
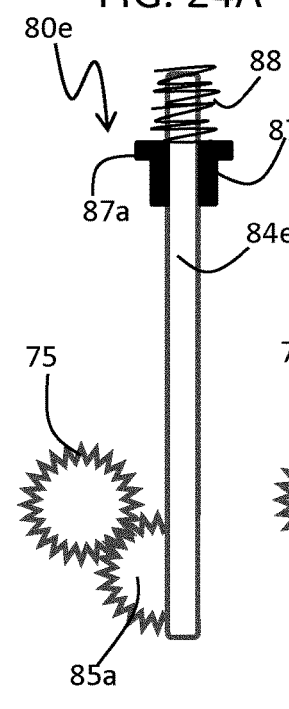
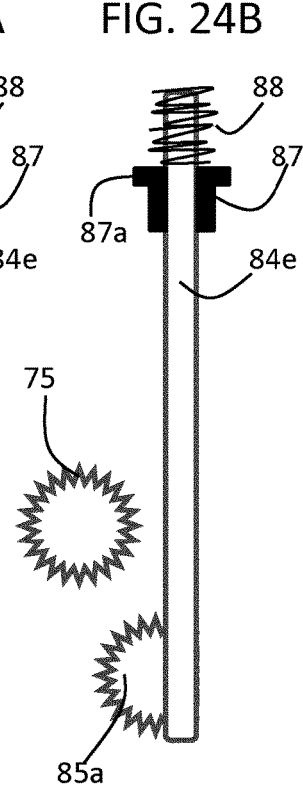

PIVOTING FISHING ROD

CROSS REFERENCE TO RELATED APPLICATIONS

This application is the U.S. National Phase of International Application No. PCT/CA2019/051158, filed Aug. 22, 2019, designating the U.S. and published in English as WO 2020/037426 A1 on Feb. 27, 2020, which claims priority to U.S. Provisional Application No. 62/720,954, filed Aug. 22, 2018. Any and all applications for which a foreign or domestic priority claim is identified here or in the Application Data Sheet as filed with the present application are hereby incorporated by reference under 37 CFR 1.57.

BACKGROUND OF THE INVENTION

Field of the Invention

The present invention relates to fishing rods, and more particularly fishing rods pivotally coupled to a base.

Description of the Related Art

A fishing rod is a popular tool for both recreational fishing and subsistence fishing. Design and commercialization of the fishing rod is extensive in terms of both variety of technology and history of development. Extensive development has also occurred in fishing rod accessories (also referred to as fishing tackle) including, for example, hooks, lines, sinkers, floats, rods, reels, baits, lures, spears, nets, gaffs, traps, waders and tackle boxes.

While the fishing rod is a functional and commercially successful solution for fishing, a drawback if the fishing rod is that the fishing rod and/or fishing line and/or a water surface entry point of the fishing line must be actively monitored by a fisherman (also referred to as angler) to observe evidence of a fish strike.

Fishing rod holders and fishing apparatus with mounted fishing rigs and lines have been developed that provide an alert of a fish strike. Examples of such fishing rod holders or fishing rigs are disclosed in U.S. Pat. No. 9,095,130 by Coulson (4 Aug. 2015), U.S. Pat. No. 8,978,288 by Olson et al. (17 Mar. 2015), U.S. Pat. No. 7,992,341 by Renstrom (9 Aug. 2011), U.S. Pat. No. 6,594,941 by Anderson (22 Jul. 2003), U.S. Pat. No. 6,564,496 by Scherg (20 May 2003), U.S. Pat. No. 5,915,940 by Gross et al. (29 Jun. 1999), U.S. Pat. No. 5,896,694 by Midha (27 Apr. 1999), U.S. Pat. No. 5,564,213 by Rinehart (15 Oct. 1996), and U.S. Pat. No. 5,067,269 by Eppley et al. (26 Nov. 1991), and in US Patent Application Publication Nos. 2014/0090287 by Olson et al. (3 Apr. 2014), 2009/0272022 by Grega (5 Nov. 2009), and 2007/0169395 by Rayfield (26 Jul. 2007). Many of these disclosures describe a tip-up device. A tip-up device suspends a line and terminal tackle such as hook and bait at a desired depth in water, and detects when a fish strikes, without the fisherman/angler having to be in active contact with the device. When a fish does engage the terminal tackle, a flag can either "tip up" or "tip down" to signal the angler that a fish has taken the bait. Because the angler does not need to stay with his line and can see that the flag at a distance, the angler can direct attention to other tasks and activities operating the tip up device and/or is able to operate multiple spatially distributed tip up devices at the same time.

A problem with the tip up device is a tendency to provide false positives resulting in repeated check and resetting of the alert flag when the tip up alert is activated without a fish strike. Activation mechanisms of tip up devices may be configured to compensate for false positives; however, avoiding false positives often leads to false negatives where a fish strike is undetected by the alert flag. While the false positive problem is often preferable to the false negative problem, it is nevertheless a source of concern or annoyance for the angler.

Another problem with the tip-up device is ineffective management of load stress during a fish strike.

Another problem with the tip up device is that it is often constructed in a spread horizontal design and in an activated state the alert flag is low to the ground so as to reduce remote distance observation and the combination of the horizontal spread and low flag creates an encumbered and hindered access to the fishing rod or fishing rig.

Accordingly, there is a continuing need for an alternative fishing rod device or assembly that can afford the angler a hands-free monitoring of a fish strike.

SUMMARY OF THE INVENTION

In an aspect there is provided, a pivoting fishing rod device comprising:

a fishing rod frame pivotally coupled to a base arm on a rotational joint;

the fishing rod frame comprising a rod arm and a support arm;

rotation of the fishing rod frame relative to the base arm provided on an axis of rotation defined by the rotational joint, the rod arm coupled to the support arm so that the rotation of the rod arm and the support arm is co-dependent;

a first resilient member coupled to a first attachment point mounted on the base arm and a second attachment point mounted on the support arm, the first resilient member configured to produce a tension counterbalance force as a distance between the first attachment point and the second attachment point increases.

In another aspect there is provided, a pivoting fishing rod device comprising:

a fishing rod frame pivotally coupled to a base arm on a first rotational joint;

the fishing rod frame comprising a rod arm;

rotation of the rod arm relative to the base arm provided on an axis of rotation defined by the rotational joint;

a reel rotationally coupled to the base arm on a second rotational joint;

a brake mounted to the base arm, the brake comprising an actuator handle, the actuator handle communicative with a first resilient member biasing the brake to engage the second rotational joint to maintain the reel in a brake position, the first resilient member biasing the actuator handle to maintain a first linear position;

an actuating surface of the actuator handle positioned to abut the rod arm at a first angular position of the rod arm corresponding to a first load applied to the rod arm, the first load less than a predetermined threshold load for relieving stress on the rod arm;

the rod arm at a second angular position corresponding to a second load applied to the rod arm, the second load greater than the predetermined threshold load for relieving stress on the rod arm, an interior angle of the rod arm with the base arm being greater at the first angular position than the second angular position;

the rod arm in the second angular position moving the actuating handle from a first linear position to a second linear position to disengage the brake from the second rotational joint to allow rotation of the reel in a release position.

BRIEF DESCRIPTION OF THE DRAWINGS

FIG. 1 shows the top of an illustrative first variant of the pivoting fishing rod device;
FIG. 2 shows a first side of the device shown in FIG. 1;
FIG. 3 shows a second side of the device shown in FIG. 1;
FIG. 4 shows a perspective view of the device shown in FIG. 1;
FIG. 5 shows the front of the device shown in FIG. 1;
FIG. 6 shows the bottom of the device shown in FIG. 1;
FIG. 7 shows the back of the device shown in FIG. 1;
FIGS. 17A and 17B show comparable side views of the device shown in FIG. 1, illustrating a captured position (FIG. 17A) of an alert indicator incorporated in the device and a released position (FIG. 17B) of the alert indicator;
FIGS. 22A and 22B show comparable side views of an illustrative third variant of the pivoting rod device, illustrating a brake position (FIG. 22A) and a release position (FIG. 22B) of the third variant device;
FIGS. 23A and 23B show comparable block schematic views of a first alternative brake to the brake shown in FIG. 19, illustrating the brake and reel in a brake position (FIG. 23A) and in a release position (FIG. 23B);
FIGS. 24A and 24B show comparable block schematic views of a second alternative brake of the brake shown in FIG. 19, illustrating the brake and reel in a brake position (FIG. 24A) and in a release position (FIG. 24B).

DETAILED DESCRIPTION OF PREFERRED EMBODIMENTS

Figure 8:
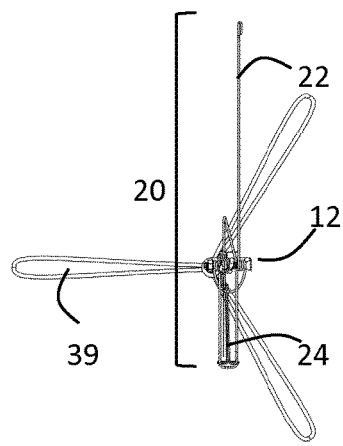
FIG. 8 shows the top of an illustrative second variant of the pivoting fishing rod device.
Figure 9:
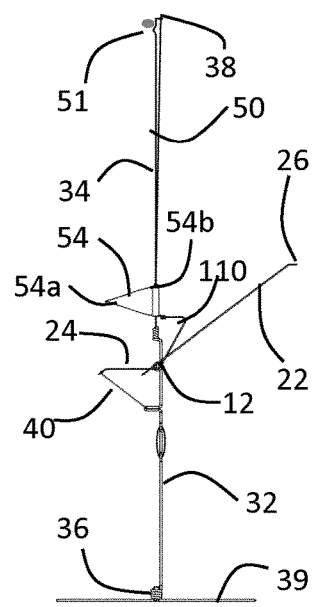
FIG. 9 shows the side of the device shown in FIG. 8.
Figure 10:
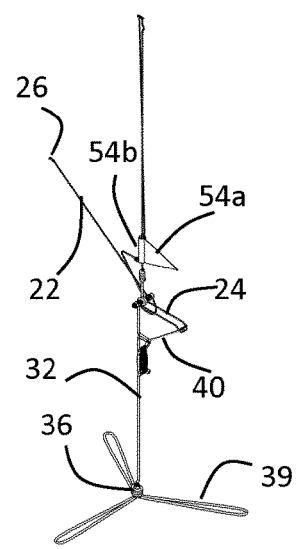
FIG. 10 shows a perspective view of the device shown in FIG. 8.
Figure 11:
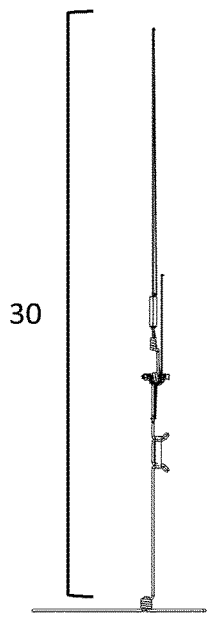
FIG. 11 shows the front of the device shown in FIG. 8.
Figure 12:
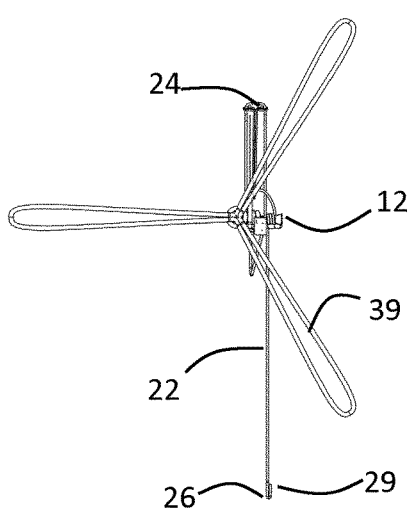
FIG. 12 shows the bottom of the device shown in FIG. 8.
Figure 13:
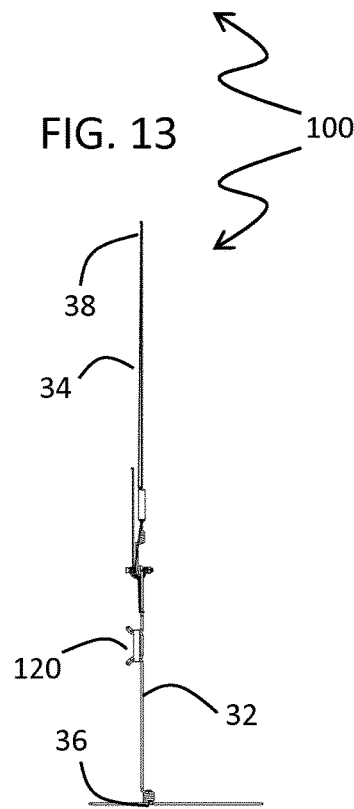
FIG. 13 shows the rear of the device shown in FIG. 8.

Now referring to the drawings, FIGS. 1 to 7 show a first variant of the pivoting fishing rod device 10.
The device 10 comprises a fishing rod frame 20 and vertical shaft 30 coupled in an operational X-shaped cross-configuration on a rotational joint 12, with the fishing rod frame 20 comprising a rod arm 22 and a support arm 24, and the vertical shaft 30 comprising a base arm 32 and a signal arm 34. In operation, the device 10 maintains a general cross-configuration position of the fishing rod frame 20 and vertical shaft 30 due to limits of rotation imposed by abutting engagement of a ledge stop 35a formed at a proximal end 35 of the base arm 32 with either the rod arm 22 or the support arm 24. In certain examples, with a modified rotational joint 12 and surrounding proximal end 35 of base arm 32 permitting full rotation of fishing rod frame 20, a storage or transport state of the device 10 is obtained by manually manipulating the fishing rod frame 20 and vertical shaft 30 to be rotated relative to each other to be in a substantially aligned position that may optionally be latched together in the substantially aligned position. The X-shape of the cross-configuration may not be salient from FIGS. 2 to 4 because of the reduced dimension of the support arm 24 relative to the other three arms and may perhaps be considered as a Y-shape or a T-shape; however, regardless of the asymmetry of the length of the support arm 24 it is nevertheless an arm that is included in ascribing shape to the cross-configuration and moreover, the support arm 24 may be modified to be lengthened depending on a desired implementation, and therefore describing the cross-configuration as X-shaped is more accurate than Y-shaped or T-shaped. Thus, in operation of the device 10, the four arms project in four different directions from the rotational joint 12, the rod arm 22 extending in a first direction from the rotational joint 12 and the support arm 24 extending in a second direction from the rotational joint 12, the base arm 32 extending in a third direction from the rotational joint 12 and the signal arm 34 extending in a fourth direction from the rotational joint 12.

The device 10 comprises four arms: the rod arm 22, the support arm 24, the base arm 32, and the signal arm 34 coupled on the rotational joint 12 in a hub and spoke arrangement with each arm projecting from the rotational joint 12 at a proximal end and extending to an opposing distal end. Thus, the base arm 32 is bound by proximal end 35 and distal end 36, the signal arm 34 is bound by proximal end 37 and distal end 38, the rod arm 22 is bound by proximal end 25 and distal end 26, and the support arm 24 is bound by proximal end 27 and distal end 28.

Figure 14:
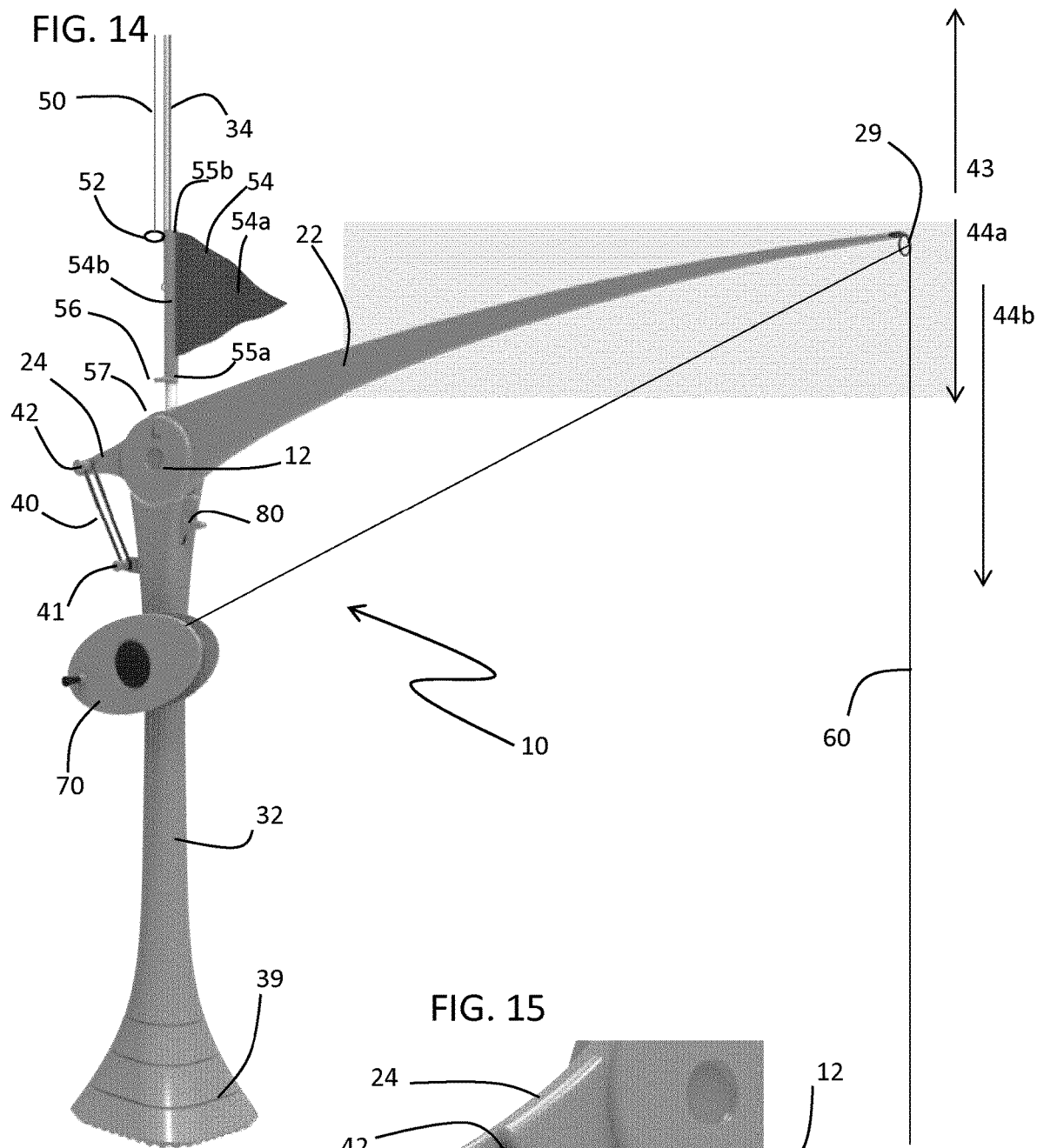
FIG. 14 shows a side view of the device shown in FIG. 1 in an example of an operational state.

Each of the four arms presents at least one functional feature. For example, as shown in FIG. 14, an eyelet 29 is disposed at or near the distal end 26 of the rod arm 22, the eyelet 29 defining an aperture for receiving a fishing line 60, the eyelet 29 carrying the fishing line 60 and the eyelet 29 defining a load or resistance point on the rod arm 22. A second attachment point 42 is disposed at or near the distal end 28 of the support arm 24, the second attachment point providing a connecter or coupling surface for engaging a first resilient member 40. A first attachment point 41 is disposed near the proximal end 35 of the base arm 32, the first attachment point provides a connecter or coupling surface for engaging the first resilient member 40, the first and second attachment points 41, 42 and the first resilient member 40 cooperating to provide a counterbalance force to support the rod arm 22 and maintain a desired first angular position or first range of angular position while carrying a first load comprising a fishing line and any desired terminal tackle prior to a fish strike. A foot 39 or feet formed at the distal end 36 of the base arm 32, the foot 39 or feet for receiving abutting support from engagement of a ground/base surface. The foot 39 defines an interior cavity (not shown) that communicates with an opening 39a formed at the distal end 36, the cavity opening reversibly closed by cover 39b. The cavity can be used for storage of tackle or to insert weight as desired. The foot 39 may be substituted by a spike (not shown) for piercing a ground/base surface to produce a friction fit of the base arm 32 in a ground/base surface. A reel 70 for spooling fishing line 60, and a break interaction with reel 70 are also disposed on base arm 32. A third attachment point 51 is disposed at or near the distal end 38 of the signal arm 34, the third attachment point 51 provides a connecter or coupling surface for engaging a second resilient member 50. A flag 54 is slidably mounted on the signal arm 34, a fourth attachment point 52 is disposed on the flag 54, the fourth attachment point provides a connecter or coupling surface for engaging the second resilient member 50, the third and fourth attachment points 51, 52 and the second resilient member 50 cooperating to bias the flag 54 away from the proximal end 37 of the signal arm 34 and towards the distal end 38 of the signal arm 34. The flag 54 comprises a display portion 54a extending from a pole sleeve portion 54b, the pole sleeve 54b slidably mounted on signal arm 34 which is shaped as a flag pole. The pole sleeve 54b is a tube with opposing open proximal and distal ends 55a, 55b, with the fourth attachment point 52 disposed on the pole sleeve 54b at or near a distal end 55b and a latch pin 56 disposed at a proximal end 55a. The latch pin 56 projects from the pole sleeve 54b, the longitudinal axis of the latch pin 56 is substantially perpendicular to the longitudinal axis of pole sleeve 54b as well as the longitudinal axis of the signal arm 34, while the pole sleeve 54b and the signal arm 34 are substantially co-axially aligned. Latch pin 56 is captured within L-shaped slot cut in housing of rotational joint 12, with the latch pin 56 release when rotational motion aligns the vertical arm of the L-shaped slot with the longitudinal axis of the signal arm 34.

Rotation of the fishing rod frame 20 relative to the vertical shaft 30 is provided on an axis of rotation defined by the rotational joint 12, the rod arm 22 connected to the support arm 24 so that the rotation of the rod arm 22 and the support arm 24 is a coordinated or co-dependent rotation. As shown in FIGS. 1 to 7, the rod arm 22 and the support arm 24 are integrally formed but can readily be manufactured as separate pieces that are then permanently or reversibly connected with each other and with rotational joint 12.

A mechanism of rotational joint 12 is not shown in detail as rotational joint mechanisms are well known and many rotational joint configurations are abundantly available, and therefore rotational joint 12 is readily understood without a drawing. Rotational joint 12 comprises a hinge pin or pivot pin (not shown) extending from the vertical shaft 30 at a location in between proximal end 35 of the base arm 32 and proximal end 37 of the signal arm 34, the pivot pin having an axis that is substantially perpendicular to a longitudinal axis of the base arm 32, the pivot pin received in a corresponding joint cradle or joint bore or joint sleeve formed in the fishing rod frame at a location in between proximal end 25 of the rod arm 22 and proximal end 37 of the support arm 24, the joint cradle or joint bore or joint sleeve having an axis that is substantially perpendicular to a longitudinal axis of the rod arm 22. Rotational coupling of the pivot pin to its corresponding joint cradle, bore or sleeve may occur in any convenient reversible, semi-permanent or permanent manner using any suitable retainer or fastener as are well known and abundantly available. Optionally, rotation of the pivot pin relative to its corresponding joint cradle, bore or sleeve may be enhanced by any convenient component that reduces friction such as lubricant, bearings, and the like. Rotational joint 12 provides a single degree of freedom supporting rotational motion in both clockwise and counterclockwise directions. In examples of the fishing rod device, including multiple rotational joints, the rotational joint 12 coupling the rod arm to the base arm will be considered the first rotational joint.

In an operational state of device 10, the base arm 32 is stationary relative to a ground or base surface by any convenient fixation mechanism such as friction fit, abutting support, mounting, and the like, and therefore the base arm 32 and vertical shaft 30 do not rotate relative to ground as the fishing rod frame 20 begins rotation upon a fish strike. Thus, the base arm 32 provides a grounded stationary reference for rotational joint 12, and fishing rod frame 20 therefore rotates relative to both the base arm 32 and a ground or base surface upon a fish strike. The fishing rod frame 20 and the rod arm 22 maintain a first angular position or a first range of angular position in absence of a fish strike and change to a second angular position or a second range of angular position upon a fish strike. The first range of angular position and the second range of angular position may overlap. The first range of angular position is defined by a lower limit (angular position within the first range that provides the smallest interior angle between the rod arm 22 and the base arm 32) that is indicative of a true fish strike, while the second range of angular position is defined by variation of applied load due to fish motion. Therefore, the second range of angular position may partially or fully overlap the first range of angular position, but the lower limit of the second range of angular position will be a smaller interior angle between the rod arm 22 and the base arm 32 as compared to the lower limit of the first range of angular position.

The axis of rotation defined by the rotational joint 12 is substantially perpendicular to a longitudinal axis defined by the base arm 32, and in an operational state of device 10, the axis of rotation defined by the rotational joint 12 is usually maintained substantially parallel (ie., horizontal orientation) to a ground or base surface.

Figure 15:
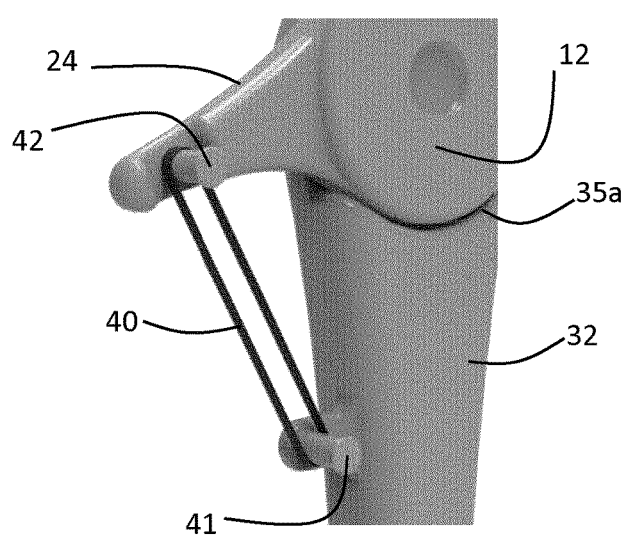
FIG. 15 shows a magnified view of a first resilient member included in the device shown in FIG. 1.

As shown in greater detail in FIGS. 14 and 15, the first resilient member 40 is coupled to a first attachment point 41 mounted on the base arm 32 and a second attachment point mounted 42 on the support arm 24. The first and second attachment points are shown to be located near the rotational joint 12, but may be varied to be greater distances from the rotational joint 12 when a greater mechanical advantage is desired. The first and second attachment points 41, 42 are shown as pins with flanged ends, but may take any convenient shape or form, such as hooks, rings, clips, and the like, to be coupled to the first resilient member 40.

The first resilient member 40 applies a counterbalance force to the support arm 24 providing a support vector 43 to counterbalance a first load vector 44a of a first load applied to the rod arm 22, the first load comprising a fishing line 23 and hook (not shown) hanging from the eyelet 29 of the rod arm 22 at a desired depth in water, the first load vector 44a in a direction of the vector of gravity, the counterbalance force providing the support vector 43 biasing the fishing rod frame 20 within the first range of angular position with the first load applied, and the counterbalance allowing rotational motion of the fishing rod frame 20 to the second range of angular position upon applying a second load, the second load comprising a fish strike on the fishing line and hook, the second load resulting in a second load vector 44b applied to the fishing rod frame 20 at the eyelet 29. Variation of the magnitude of the first load vector 44a will occur as a result of inconsistent water conditions, and therefore will typically be a more consistent magnitude range than a variation of the magnitude of the second load vector 44b which may vary drastically depending on fish action or fish motion subsequent to a fish strike. The range of variation of magnitude of the second load vector 44b may partially or fully overlap the range of magnitude variation of the first load vector, but the maximum magnitude in the range of variation of the magnitude of the second load vector 44b will be greater than the maximum magnitude in the range of variation of magnitude of the first load vector 44a. Support vector 43, first load vector 44a and second load vector 44b are shown in FIGS. 14, 17a and 17b are illustrated without indicating range of variation, and the illustrated vector magnitudes are not indicative of any guiding relationship between any of the vectors.

Figure 16:
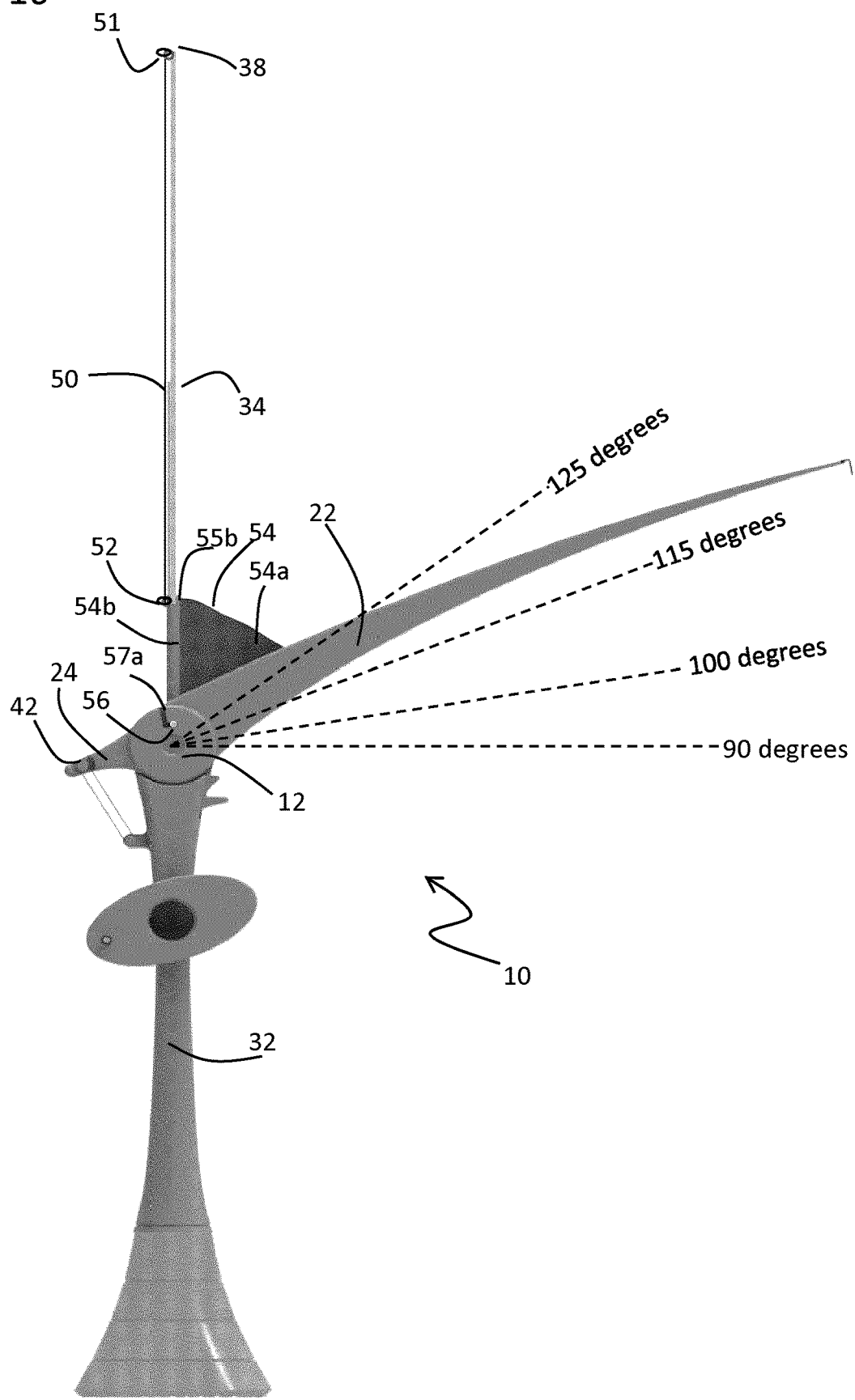
FIG. 16 shows the side view of the device shown in FIG. 1, illustrating examples of angles of action.

As shown in greater detail in FIGS. 16, 17A, 17B, the second resilient member 50 is coupled to the third attachment point 51 mounted at the distal end 38 of signal arm 34 and the fourth attachment point 52 mounted at the distal end 55b of the pole sleeve 54b of flag 54. The third and fourth attachment points are shown to be located at distal ends of the signal arm 34 and pole sleeve 54b, respectively, but locations spaced from distal ends are feasible as well. The third and fourth attachment points 51, 52 are shown as hoops with gaps for inserting the second resilient member 50, but may take any convenient shape or form, such as hooks, posts, clips, and the like, to be coupled to the second resilient member 50.

The second resilient member 50 cooperates with the third and fourth attachment points 51, 52, to bias the flag 54 towards the distal end 38 of the signal arm 34, the signal arm 34 shaped as a flag pole for easy sliding of pole sleeve 54b of flag 54 in the biasing direction provided by a tension force applied by the second resilient member 50.

Latch pin 56 (also see FIG. 14) projecting perpendicularly from pole sleeve 54b of flag 54 is captured within L-shaped slot 57 cut in housing of rotational joint 12. L-shaped slot 57a comprises a first slot 57a communicative with second slot 57b. At its distal end first slot 57a is communicative with the perimeter or circumferential surface of the housing of rotational joint 12, and at its proximal end slot 57a is communicative with the channel defined by second slot 57b. A longitudinal axis of the first slot 57a is oriented substantially perpendicular to the axis of rotation of rotational joint 12 and oriented in a substantially radial direction relative to the housing of the rotational joint 12. A longitudinal axis of the second slot 57b oriented substantially perpendicular to the longitudinal axis of the first slot 57a to provide the L-shaped slot 57.

When setting device 10 for operation, starting with flag 54 in a released position, pole sleeve 54b and rod frame 20 are manually manipulated to rotate first slot 57a into an aligned position with latch pin 56, and then pole sleeve 54b is manually manipulated to insert latch pin 56 in to the distal end opening of slot 57a and further inserted to the proximal end of first slot 57a. After latch pin 56 is positioned at the proximal end of first slot 57a, rod arm 22 is manually manipulated to rotate toward the signal arm 34 (ie., to decrease the angle between the rod arm 22 and the signal arm 34) to insert and capture latch pin 56 in second slot 57b. Length of second slot 57b or the distance between the captured position of latch pin 56 and the proximal end of first slot 57a is predetermined to coincide with the first range of angular position of the rod arm 22 so that while the rod arm 22 rotates in a first range of angular positon due to support vector 43 counterbalancing first load vector 44a the latch pin 56 remains captured in second slot 57b. The first range of angular positions is defined by an upper limit and lower limit, the upper limit defined as the angular position within the first range that provides the largest interior angle (the interior angle is an angle measured without traversing the support arm 24, while an exterior angle is measured with traverse of the support arm 24, with the sum of corresponding interior angle and exterior angle measurement equaling approximately 360 degrees) between the rod arm 22 and the base arm 32, the lower limit defined as the angular position within the first range that provides the smallest interior angle between the rod arm 22 and the base arm 32. The lower limit of the first range of angular position is predetermined to be a threshold angular position for indicating a true fish strike applying the second load vector 44b to rod arm 22. As the rod arm 22 rotates to an angular position approximately equal to the lower limit of the first range, first slot 57a comes into substantial alignment with the longitudinal axis of pole sleeve 54a and longitudinal axis of signal arm 34 and latch pin 56 is released from second slot 57b into first slot 57a, and pole sleeve 54a is pulled up signal arm 34 by the biasing force of the second resilient member 50. As the fish strike continues the load vector may vary drastically depending on fish movement, while the rod arm 22 remains counterbalanced by support vector 43 and therefore the second range of angular position may be a wide range that can partially or fully overlap the first range of angular position. The second range is distinguished from the first range in that the lower limit of the second range will be an angular position with a smaller interior angle between the rod arm 22 and the base arm 32 than the lower limit of the first range.

The reel 70 and brake 80 combination mounted on base arm 32 is shown in greater detail in FIGS. 18, 19, 20A and 20B. The reel 70 is mounted to the base arm 32 on a second rotational joint 72. The reel 70 holds fishing line 60 wound on a spool 71, and unwinds or winds line 60 by rotation in opposite directions. The second rotational joint 72 comprises a reel shaft 73 co-axial with and connected to the spool 71 rotationally mounted to the base arm 32, the reel shaft received through a bore 74 formed in the housing of the base arm 32. A first end of the reel shaft 73 connects to the spool 71 and a second end of the reel shaft connects to a sprocket 75 that is mounted with free rotation on sprocket pin 76. Therefore, reel 70 and sprocket 75 are connected and rotate coincidentally, with sprocket pin 76 stabilizing the rotation of sprocket 75 as well as stabilizing the second rotational joint 72. Reel 70 is equipped with a reel handle 77 for manual manipulation of winding or unwinding line 60.

Figure 19:
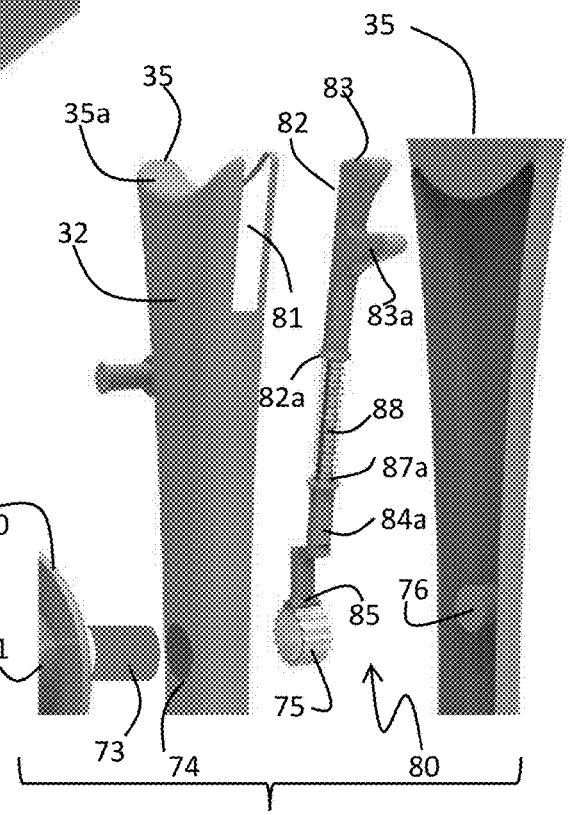
FIG. 19 shows an exploded view of the reel and brake combination shown in FIG. 18.

Brake 80 is biased against sprocket 75 to prevent rotation of sprocket 75 and thereby prevent rotation of reel 70. Brake 80 is mounted within the housing of base arm 32. FIG. 19 shows the base arm 32 housing in an exploded view, an interaction of brake 80 with sprocket 75. A slot 81 is defined in the housing of base arm 32 at its proximal end 35. An actuator handle 82 of brake 80 is mounted in slot 81. The actuator handle 82 comprises a terminal actuating surface 83 for abutting actuation by rod arm 22 during rotation of rod arm 22 to a third range of angular position. The actuator handle 82 also includes a handle grip 83a for manual manipulation of brake 80 to release sprocket 75. The actuator handle 82 controls a 3-bar linkage 84 that terminates with a gripper 85 that prevents rotation of sprocket 75 when engaged with teeth of sprocket 75. The 3-bar linkage comprises a plunger bar 84a, a first end of the plunger bar 84a connected to actuator handle 82 and a second end of plunger bar 84a pivotally coupled on a first pivot joint 86a to a first end of a swing bar 84b, a middle portion of the swing bar 84b pivotally coupled to the housing of base arm 32 on a second pivot joint 86b, and a second end of the swing bar 84b pivotally coupled on a third pivot joint 86c to a first end of a lock bar 84c, a second end of the lock bar 84c mounting the gripper 85. As second pivot joint 86b couples swing bar 84b to the housing of base arm 32, the second pivot joint 86b stabilizes the 3-bar linkage by pinning it to the housing structure. Further stabilization of the 3-bar linkage is provided by a retention bushing 87 that is also grounded to the housing of the base arm 32. The retention bushing 87 slidably receives plunger bar 84a, and constrains the motion of plunger bar 84a to a translation degree of freedom. The retention bushing ends with a circumferentially projecting first flange 87a that cooperates with a circumferentially projecting second flange 82a to hold spring coil 88 mounted on plunger bar 84a between the first and second flanges. The circumferentially projecting second flange 82a is formed at an end of actuator handle 82 at its fixed joint with plunger bar 84a. Thus, actuating surface 83 is disposed at a first end of actuator handle 82 and second flange 82a is disposed at a second end of actuator handle 82.

Figures 20A, 20B:
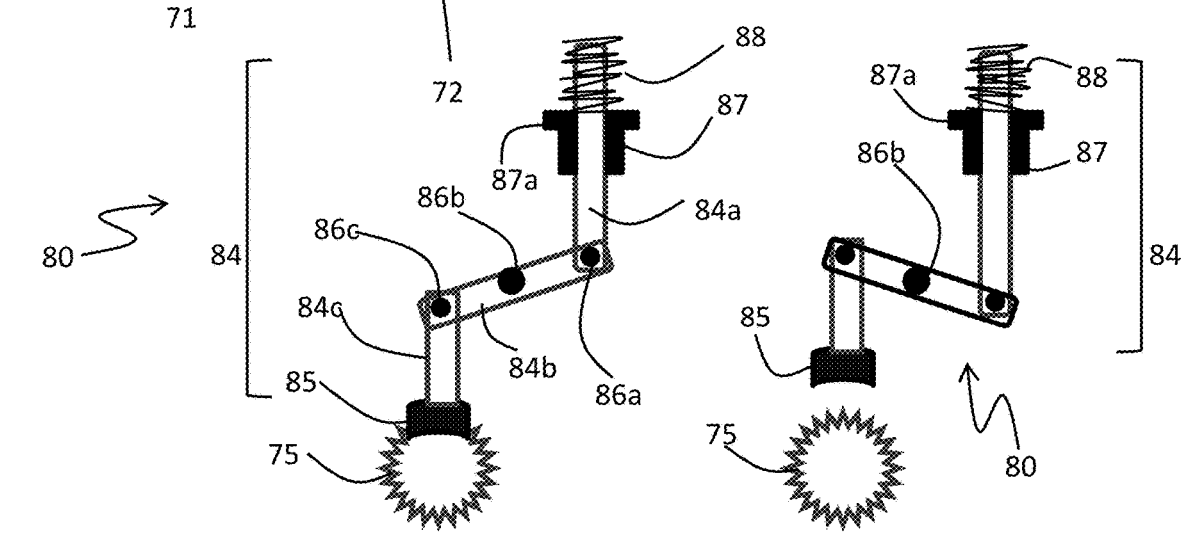
FIGS. 20A and 20B show comparable block schematic views of the brake shown in FIG. 19, illustrating the brake and reel in a brake position (FIG. 20A) and in a release position (FIG. 20B)

When the device 10 is in operation subsequent to a fish strike, and the rod arm is rotating in the second range of angular positions, a continued increase in load applied by vigorous fish movement may cause the rod arm 22 to rotate to a third range of angular positions. The upper limit (largest interior angle between the rod arm 22 and base arm 35) of the third range is an angular position of the rod arm 22 that releases gripper 85 from sprocket 75 allowing rotation of reel 70. The lower limit (smallest interior angle between the rod arm 22 and base arm 35) of the third range is imposed by the ledge stop 35a formed at the proximal end 35 of base arm 32, the rod arm abutting the ledge stop 35a as the rod arm 22 approaches an angular position that is about a 90 degree interior angle relative to the base arm 32. The brake 80 is biased by a compressive force of coil spring 88 to prevent rotation until the rod arm 22 rotates to the third range of angular positions. As the magnitude of the second load vector 44b increases due to fish motion the rod arm 22 rotates to an upper limit of the third range of angular positions and abuts the actuating surface 83 of actuator handle 82. Further increase in magnitude of the second load vector 44b causes the rod arm 22 to overcome the biasing compressive force of the coil spring 88 and the rod arm 22 engages the actuating surface with abutting contact to provide translational motion of plunger bar 84a relative to retainer bushing 87. As shown in FIGS. 20a and 20B, translation of plunger bar 84a causes swing bar 84b to rotate on second pivot joint 84b which lifts lock bar 84c and its terminally mounted gripper 85 from sprocket 75 to complete a transition of brake 80 from a braking state to a releasing state allowing free rotation of reel 70. If the magnitude of the second load vector 44b decreases to an extent that the rod arm 22 rotates to an angular position that results in an interior angle with the base arm 32 that is greater than the upper limit of the third range of angular positions then the biasing compressive force of coil spring cooperating with first and second flanges 87a, 82a, translates the actuator handle within slot 81 to return to its biased braking position. The compressive force of the coil spring 88 may be selected to coincide with a predetermined threshold load force or magnitude of second load vector that is expected to provide an advantage for transitioning from a braking position to a release position, for example as may be desired to ease stress on the device 10 or to simulate an angler action.

The first, second, and third range of angular positions each benefit from a counterbalancing effect of the first resilient member 40, but are distinguished from each other based on functional events that may occur during operation of the device 10 before a fish strike and after an initial fish strike and during continued fish aggression on a bait and hook. The first range of angular position coincides with a line and terminal tackle load prior to fish strike with latch pin 56 maintained in a captured position in second slot 57b. Latch pin 56 may be stationary or may move within second slot 57b, but as long as second slot 57b retains latch pin 56, the latch pin 56 remains in a captured position. Second slot 57b is bound by a closed end and an open end communicative with an open proximal end of first slot 57a. In device 10, the upper limit of the first range of angular position is defined by an angular position of rod arm 22 that results in abutting contact of latch pin 56 with closed end of second slot 57b and the lower limit of the first range of angular position is defined by the angular position of rod arm 22 that allows latch pin 56 to move to a release position by moving through open end of second slot 57b into proximal end of first slot 57a. The extent of range between the upper and lower limits of the first range may be adjusted by changing the length of second slot 57b.

The second range of angular positions coincides with a fish strike load and is defined by upper and lower limits of rotation imposed on the rotation of rod arm 22 and the support arm 24, such as is imposed by the ledge stop 35a formed at or near proximal end 35 of base arm 32. In device 10, the upper limit of the second range is defined by abutting contact of the support arm 24 with the ledge stop 35a, and the lower limit of the second range is defined by abutting contact of rod arm 22 with the ledge stop 35a.

The third range of angular position coincides with a released state of the reel 70. In device 10, the upper limit of the third range is defined by abutting contact of rod arm 22 with actuating surface 83 to move the actuating surface 83 and plunger bar 84a in a distal direction forcing transition of the reel 70 and brake 80 interaction from a braking state to a released state, and the lower limit of the third range is defined by abutting contact of rod arm 22 with the ledge stop 35a.

As configured in the iteration of device 10 shown in the Figures, the first and third ranges are each subsets of the second range, and the first and third ranges do not overlap, but other configurations are readily feasible.

The first, second, and third ranges may be further illustrated by describing an example of first, second and third ranges of angular positions in context of specific illustrative angular positions of action of rod arm 22 that may occur in operation of device 10.

The rod arm 22 as shown in FIG. 16 has four illustrative angles of action (approximately 125 degrees, approximately 115 degrees, approximately 100 degrees, and approximately 90 degrees when measuring the interior angle between the rod arm 22 and the base arm 32). The 125 degree angle is when the arm setup is at rest. The 115 degree angle is when the line pulls the arm down and the flag is released to indicate a bite. The line tension is released by transitioning the brake 80 and reel 70 interaction from a braked state to a release state when the arm is pulled to the 100 degree position or lower depending on fish aggression will lock if the required tension is not kept or sustained, and the rod arm bottoms out at 90 degrees. Thus, the first range of angular positions of the rod arm is from about 125 degrees to about 115 degrees, the second range of angular positions is from about 125 degrees to about 90 degrees, and the third range of angular positions is from about 100 degrees to about 90 degrees. The set of angles of action are merely examples for purpose of illustration and many other sets of angles of action may be selected and achieved by adjusting configuration and interaction of the components of the fishing rod device. As the set of angles of action are merely illustrative, the angles may not correspond exactly to the positioning of structural elements shown in FIG. 16, and perhaps the set of angles of action may more accurately be 125 degrees, 115 degrees, 90 degrees and 80 degrees. As the angles of action correspond to limits of angular ranges, the angles of actions may also be considered angles of demarcation.

In certain examples, the signal arm is optional. When the fishing rod device includes a signal arm having a threshold angular position of the rod arm for triggering an alert indicator, the range of angular positions of the rod arm corresponding to the reel in a released position for free rotation is the third range of angular positions. But, when the signal arm is not considered, then the range of angular positions of the rod arm corresponding to the reel in a released position for free rotation can be considered the second range of angular positions, and the rod arm angular position corresponding to transition of disengaging/engaging the brake from the sprocket approximately demarcates the lower limit of the first range of angular positions and the upper limit of the second range of angular positions.

Referring now to FIGS. 8 to 13 and 21, a second illustrative variant 100 of the pivoting fishing rod is provided and generally configured as a more portable and packable assembly. The second variant device 100 is generally a wire frame assembly with the distal end 36 of base arm 32 coupled to a tri-branched foot 39 for abutting support of the second variant device 100 on a ground or base surface. The wire frame incorporates the principal mechanisms and structures of the device 10 in a more portable solution without the brake 80 and reel 70 features.

The second variant device 100 comprises four arms included in device 10 and further comprises a fifth arm; more specifically the five arms (the rod arm 22, the support arm 24, the base arm 32, the signal arm 34 and a trigger arm 110) are coupled on the rotational joint 12 in a hub and spoke arrangement with each arm projecting from the rotational joint 12 at a proximal end and extending to an opposing distal end. Thus, the base arm 32 is bound by proximal end 35 and distal end 36, the signal arm 34 is bound by proximal end 37 and distal end 38, the rod arm 22 is bound by proximal end 25 and distal end 26, the support arm 24 is bound by proximal end 27 and distal end 28, and the trigger arm 110 is bound by proximal end 112 and distal end 113.

Figure 21:
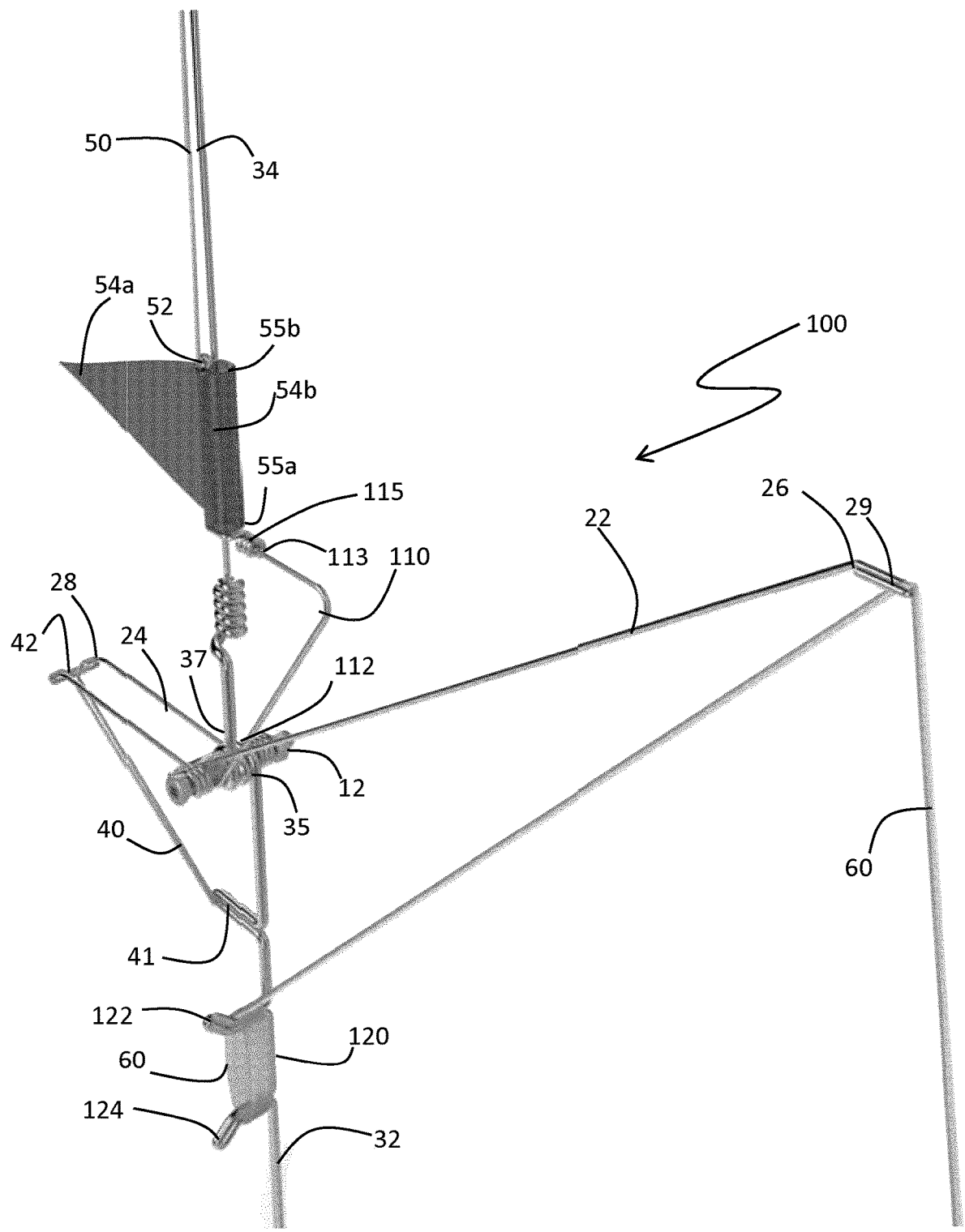
FIG. 21 shows a magnified side view of the device shown in FIG. 8 in an example of an operational state.

Each of the five arms presents at least one functional feature with the four arms in common with device 10 presenting similar functional features. For example, as shown in FIG. 21, the eyelet 29 is disposed at or near the distal end 26 of the rod arm 22, the eyelet 29 defining an aperture for receiving the fishing line 60, the eyelet 29 carrying the fishing line 60 and the eyelet 29 defining a load or resistance point on the rod arm 22. The second attachment point 42 is disposed at or near the distal end 28 of the support arm 24, the second attachment point providing a connecter or coupling surface for engaging a first resilient member 40. The first attachment point 41 is disposed near the proximal end 35 of the base arm 32, the first attachment point provides a connecter or coupling surface for engaging the first resilient member 40, the first and second attachment points 41, 42 and the first resilient member 40 cooperating to provide a counterbalance force to support the rod arm 22 and maintain a desired first angular position or first range of angular position while carrying a first load comprising a fishing line and any desired terminal tackle prior to a fish strike. A foot 39 or feet formed at the distal end 36 of the base arm 32, the foot 39 or feet for receiving abutting support from engagement of a ground/base surface. The foot 39 may be substituted by a spike (not shown) for piercing a ground/base surface to effect a friction fit of the base arm 32 in a ground/base surface. A rack 120 for winding and holding fishing line 60 is also disposed on base arm 32. The rack 120 comprises a pair of spaced prongs, a proximal prong 122 and a distal prong 124 that cooperate to form a cleat-type of rack for the fishing line 60. A flag 54 is slidably mounted on the signal arm 34, a fourth attachment point 52 is disposed on the flag 54, the fourth attachment point provides a connecter or coupling surface for engaging the second resilient member 50, the third and fourth attachment points 51, 52 and the second resilient member 50 cooperating to bias the flag 54 away from the proximal end 37 of the signal arm 34 and towards the distal end 38 of the signal arm 34. The flag 54 comprises a display portion 54a extending from a pole sleeve portion 54b, the pole sleeve 54b slidably mounted on signal arm 34 which is shaped as a flag pole. The pole sleeve 54b is a tube with opposing open proximal and distal ends 55a, 55b, with the fourth attachment point 52 disposed on the pole sleeve 54b at or near a distal end 55b and a latch pin 56 disposed at a proximal end 55a. The flag 54 can be set in a captured position by any convenient mechanism including, for example, an internal directed pin projecting radially from an interior surface of the pole sleeve 54b captured in a bore formed in signal arm 34 or an internally directed tab of the pole sleeve captured by a flange or washer mounted on signal arm 34. A flag hook 115 is disposed at or near the distal end 115 of the trigger arm 110. The flag hook 115 engaging the proximal open end 55a of pole sleeve 54b when flag 54 is in a captured position, co-dependent rotation of rod arm 22 and trigger arm 110 causing flag hook 115 to move pole sleeve 54b and actuate release of flag 54 from its captured position.

Illustrative variants have been described above. Further variants and modifications are described below. Moreover, guiding relationships for configuring variants and modifications are also described below. Still further variants and modifications are contemplated and will be recognized by the person of skill in the art.

Figure 18:
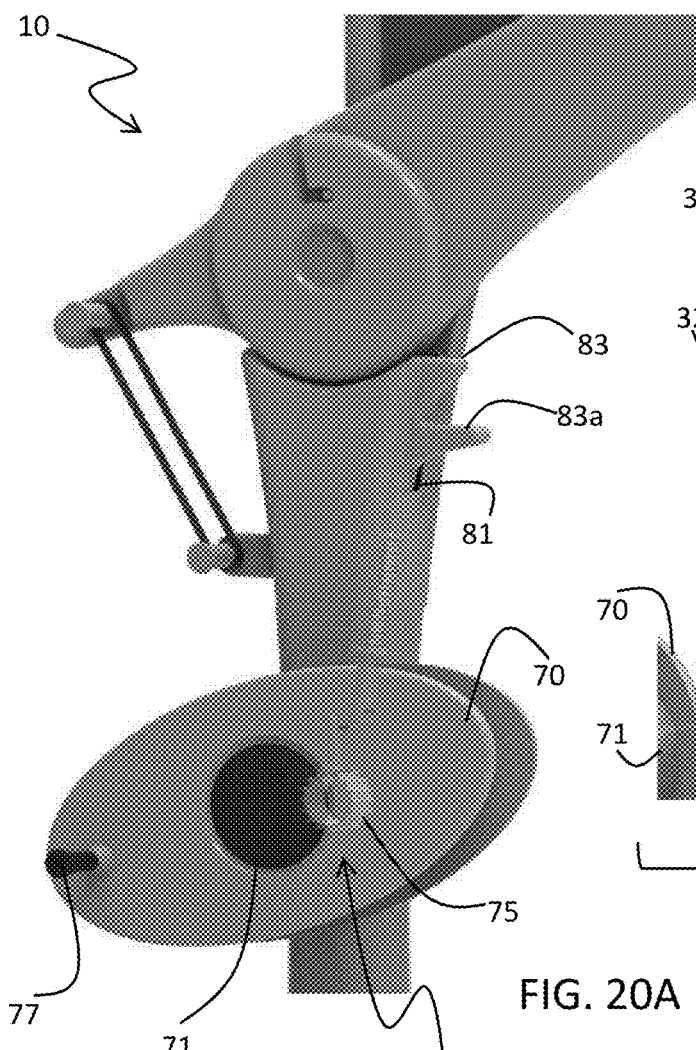
FIG. 18 shows a magnified view of a reel and brake combination included in the device shown in FIG. 1.

For example, FIGS. 22A and 22B shows an illustrative third variant of the pivoting fishing rod device 200 comprising the rod arm 22 rotationally coupled to the base arm 32, and the brake 80 and reel 70 combination mounted to the base arm. The third variant device 200 is similarly configured to the first variant device 10 as shown in FIGS. 1, 18 and 19 except that the support arm and the signal arm are removed and the first resilient member is part of the brake mechanism the first resilient member in the third variant device adapted to produce an increase in compressive counterbalance force as the actuator handle 82 of the brake 80 moves from a first linear position under a first applied load to a second linear position under a second applied load, the second load being greater than the first load. The angular position of rod arm 22 shown in FIG. 22A corresponds to the brake 80 maintaining the reel 70 in a brake position as shown in FIG. 20A. The angular position of rod arm 22 shown in FIG. 22B corresponds to the brake 80 maintaining the reel 70 in a release position as shown in FIG. 20B. Visual indicia or visual structures such as reflective posts may be attached or presented on a visible exterior surface of the reel so that rotational motion of the visual indicia or structure serves as an alert indicator of a fish strike.

As another example, FIGS. 23A and 23B show comparable views of a first alternative brake 80d engaging (FIG. 23A) the sprocket 75 mounted on the second rotational joint to maintain the reel 70 in a brake position and disengaging (FIG. 23B) the sprocket 75 to maintain the reel 70 in a release position. As shown in FIGS. 19, 20A and 20B for the brake 80, the first alternative brake 80d is biased to the engaged and brake position by a coil spring 88. The first alternative brake 80d is configured similar to brake 80 except the 3-bar linkage is replaced with a single bar, namely plunger bar 84d, which is bent or hooked to orient gripper 85 to engage sprocket 75. Interaction of plunger bar 84d with retention bushing 87, actuator handle 82, and coil spring 88 remains the same as described for brake 80.

As yet another example, FIGS. 24A and 24B show comparable views of a second alternative brake 80e engaging (FIG. 24A) the sprocket 75 mounted on the second rotational joint to maintain the reel 70 in a brake position and disengaging (FIG. 24B) the sprocket 75 to maintain the reel 70 in a release position. As shown in FIGS. 19, 20A and 20B for the brake 80, the second alternative brake 80e is biased to the engaged and brake position by the coil spring 88. The second alternative brake 80e is configured similar to brake 80 except the 3-bar linkage is replaced with a single bar, namely plunger bar 84e, that is a single straight bar with an alternative gripper 85a mounted at a distal end of plunger bar 84e, the alternative gripper 85a presenting teeth to engage sprocket 75. Interaction of plunger bar 84e with retention bushing 87, actuator handle 82, coil spring 88 remains the same as described for brake 80.

Advantages conferred by the first, second, and third variants of the pivoting fishing rod device can be compared with respect to problems of false positive alerts of fish strike and load stress on the device that are found in conventional tip-up devices. The first variant device 10 reduces false positive indication of fish strike by counterbalancing rod arm, and manages load stress on the rod arm by biased braking of reel and releasing of reel to rotate to relieve load stress when the applied load on the rod arm exceeds a predetermined threshold level. The second variant device 100 reduces false positive indication of fish strike by counterbalancing rod arm, but does not manage load stress on the rod arm. The third variant device 200 manages load stress on the rod arm, and when coil spring 88 is adapted as the first resilient member to provide a compressive counterbalance force the third variant device can also reduce false positive indication of fish strike. Additionally, the third variant device may be readily configured to provide a counterbalance independent of the braking mechanism, for example with a coil spring mounted to the base and the rod arm. All three variant devices can reduce a problem of horizontal sprawl found in most conventional tip-up devices due to vertical orientation and vertical clearance provided by the base arm. Other advantages exist for each of the variants.

A comparison of the first 10, second 100, and third 200 variant devices makes clear that in certain examples the pivoting fishing rod includes a rod arm rotationally coupled to a base arm with a brake and reel mechanism mounted on the base arm to manage load stress on the rod arm, with optionally the first resilient member installed as part of a brake and reel mechanism to counterbalance a rotation of the rod arm, and optionally including further arms such as the support arm or the signal arm. In other examples, the pivoting fishing rod includes a rod arm and at least one further arm pivotally coupled to a base arm with a first resilient member counterbalancing rotation of the rod arm. Often the at least one further arm is a support arm and counterbalancing includes a first resilient member attached to the base arm and the support arm; however if counterbalancing is achieved without the support arm then the support arm is optional. The at least one further arm may optionally be the support arm, the signal arm, the trigger arm, a handle arm functioning to provide a grip for an angler, an accessory arm or any combination of these arms.

The pivoting fishing rod device may be used in all climates and in all seasons and may be adapted to all types of fishing activity, including ice fishing or fishing from a boat or a dock.

The pivoting fishing rod may be manufactured as an intact device or may be manufactured as separate components that can be selected and assembled as desired. For example, with production of alternative rod frames of different configurations and material properties, and production of alternative base arms of different configurations and material properties, an angler could select and assemble a specific selected rod frame with a specific selected base arm to obtain a desired pivoting fishing rod device suited to characteristics of a specific fishing activity. In another example, a common rotational joint could be provided that provides a fastening surface such as a threaded bore for each arm, and each arm could be selected from a plurality of alternatives, each of the plurality of alternatives having a threaded bolt disposed at proximal end of arms, the threaded bolt configured to mate with a corresponding threaded bore in the common rotational joint; in this example an angler can select each arm as desired and fasten to the common rotational joint.

Components of the pivoting fishing rod device may be prefabricated or preformed as an integrated piece. For example, the rod arm and support arm are amenable to integrated manufacture as their rotation is co-dependent and in many examples the rod arm maintains a fixed angle relative to the support arm. The base arm and the signal arm may also be integrally formed as the base arm and signal arm, particularly in examples where the signal arm maintains a fixed angle relative to the base arm (ie., the signal arm does not rotate relative to the base arm). Integrated pieces may be provided in different versions as needed having common components of rotational coupling, with rotational coupling occurring in any convenient reversible, semi-permanent or permanent manner using any suitable retainer or fastener as are well known and abundantly available.

The fishing rod frame may be configured as a lever and therefore knowledge of lever mechanisms and knowledge of counterbalancing lever mechanisms can be accommodated in the fishing rod device described herein—without wishing to bound by a comparison, in comparing lever mechanism terminology to the illustrative rod frame and first resilient member configuration shown in FIGS. 1 to 21, the rod frame 20 is the lever, the rod arm 22 is a load arm or resistance arm of the lever, the support arm 24 is an effort arm of the lever, the rotational joint 12 is the fulcrum, the second attachment point 42 is an effort input point, and the eyelet 29 is the load or resistance point. Depending on the length of support arm 24 and the position of the second attachment point 42 for the first resilient member 40 the mechanical advantage (ie., based on a balanced moment of torque about the fulcrum) of the lever mechanism may be equal to one, greater than one, or less than one. The first resilient member attachment points may be varied according to known counterbalanced lever mechanisms. Illustrative examples of the first resilient member attachment point configurations include: a first attachment point on the base arm and a second attachment point on the support arm with the first resilient member applying a tension force; the first attachment point on the support arm and the second attachment point on the signal arm with the first resilient member applying a compression force; the first attachment point on the signal arm and the second attachment point on the rod arm with the first resilient member applying a tension force; the first attachment point on the rod arm and the second attachment point on the base arm with the first resilient member applying a compression force; or, any combination of these illustrative configurations. Mechanical advantage of the lever mechanism may be varied as permitted by each illustrative configuration. A mechanical advantage equal to or greater than one is not critical to operation of the rod apparatus, and many examples of the rod apparatus will be configured to have a mechanical advantage of less than 0.5. In further examples, the rod apparatus may be operational with a mechanical advantage of less than 0.3.

Counterbalancing rod arm rotation can provide a significant benefit of reducing false positive fish strike alerts, as rod arm rotation due to reasons other than fish strikes can be counterbalanced; for example, a rotation lower due to drag on a hook and line in water can be counterbalanced while still readily permitting rotation of the rod arm lower upon and during a fish strike. Rotational joint 12 may optionally be equipped with upper and lower rotation limits such as provided by ledge stop 35a. When an upper rotation limit is provided, the first resilient member could be configured to overbalance rod arm rotation against the upper rotation limit to further diminish risk of false positive fish strike alert.

The first resilient member 40 may be a single resilient structure or a plurality of resilient structural elements co-ordinated to achieve a desired counterbalance profile. For example, a plurality of resilient structural elements would be required if multiple if two or more of the illustrative first resilient member attachment point configurations were disposed in combination. Optionally, the first resilient member may be a plurality of resilient structural elements in a single configuration of the first resilient member attachment points. For example, in the first resilient member attachment point configuration shown in the Figures, a plurality of elastic bands may link the first and second attachment points with any desired similarity or difference in the plurality of elastic bands to achieve a desired counterbalance profile (as an example such a profile may be readily assessed as a plot of the magnitude of the support vector at different angular positions of the rod arm).

The pivoting fishing rod device is counterbalanced by the first resilient member. As described above the first resilient member may be attached to various combinations of the base arm with one or both of the support arm and the rod arm. Additionally, if a signal arm is included then the first resilient member may be attached to the single arm with one or both of the support arm and rod arm. In further examples, the resilient member may be attached to a single arm, for example the base arm. As a convenient example, the mechanism for any one of alternative brakes 80, 80d or 80e could be modified to adapt coil spring 88 to act as first resilient member by selecting for compressive properties that counterbalance or oppose a rod arm rotation towards a decreasing interior angle with the base arm; in this modification both braking and counterbalancing are provided by the brake. In another convenient example, the mechanism described for brake 80 could be adapted as a first resilient member for counterbalancing the rod arm without the brake, by removing components between the plunger bar and the reel sprocket, namely removing the swing bar 84b, the lock bar 84c, and the gripper 85. In this variant, the actuating surface 83 may be positioned to abut rod arm 22 at a desired rod arm angular position prior to fish strike and a coil spring 88 acting as the first resilient member may be selected to counterbalance rotation of the rod arm upon fish strike. In other examples, one or more resilient deflectable tabs may project from the proximal end of the base arm to abut rod arm and counterbalance its rotation upon a fish strike.

Similarly, solid compressible materials such as foam or rubber that can reform their original shape after being deformed may be mounted on the base arm to counterbalance rotation of the rod arm.

The second resilient member is optional as the signal arm is optional, since signaling could be electronically mounted within or on the rotational joint or an angler may find that hands-free observation of the counterbalanced rod arm is sufficient to monitor fish strike action. When the signal arm is included it may optionally include the second resilient member. The second resilient member biases an alert indicator such as a flag towards the distal end of the signal arm. The second resilient member may apply a tension force or a compression force depending on the configuration of the signal arm.

The first and second resilient members may be independently selected from any convenient type of resilient members having an elastic range such as an elastic band or a coil spring. The first and second resilient members may each include one or more components, for example one or more elastic bands, one or more coil springs, or any combination of elastic band and coil spring. In examples using an elastic band as a first resilient member disposed in a neutral but taut position, increasing distance between first and second attachment points results in an increase in tension force applied by the resilient member in an operational portion of its elastic range. Similarly, an elastic band selected as the second resilient member will exert, in an operational portion of its elastic range, an increase in tension force as the distance between third and fourth attachment points is increased. Alternatively, a coil spring may have a first portion of elastic range where increasing attachment point distance results in an increased tension force and a second portion of elastic range where decreasing attachment point distance results in an increased compression force by the coil spring.

Choice of an elastic band as the resilient member has several distinct advantages over choice of a coil spring. An elastic band can easily be provided in various sizes and tension details in a kit, optionally color coded or coded by other indicia to indicate tension or other technical details. The angler can readily mix and match elastic bands as desired. A large elastic band can be easily shortened by knotting a portion of the rubber band, or multiple small bands can readily be linked to form a larger band. Thus, a selection of an elastic band provides greater convenience for implementation and obtaining replacement parts. Other advantages of elastic bands include disposability, cost effectiveness, light weight, low volume, convenience, availability, and commercially available alternatives for durability and extreme temperatures (both hot and cold). Functionally the elastic band may also provide an advantage over coil spring particularly for the first resilient member as inertia for elastic bands is often less than coil springs. Therefore, the resilient member will more often be selected to be an elastic band than a coil spring. However, it should be noted in certain implementations, for example with large fish, a coil spring selection for the resilient member may be beneficial.

When an elastic band is selected as a resilient member, the elastic band may be any type of conventional or customized elastic band and may be made of any natural rubber or synthetic material or any blend thereof. When a coil spring is selected as a resilient member it may be made of any polymer or metal material.

The resilient member can be selected to have an elastic range suited for the intended rotational range of the rod arm or the intended range of the alert indicator (e.g., flag). The resilient member will often obey Hooke's Law for at least a portion of its elastic range, and specific to the fishing rod device, will often follow Hooke's Law for at least a portion of the intended range of rotation of the rod arm or range of motion of the alert indicator. But, resilient members made of materials that do not obey Hooke's Law may also be used.

Resilient members may exert linear or non-linear increase in force in response to an increased load, such as an increased load applied to the rod arm. For example, a rubber band may exert a non-linear force profile versus variation in applied load, while a coil spring may exert a linear force profile versus variation in applied load.

Linearity of change in force of the resilient member is not critical to functioning of the fishing rod device and any profile of linear or non-linear change in force in response to a change in applied load may be accommodated.

For example, rubber bands may exert a linear tension force for a portion of its elastic range and may follow Hooke's Law for a portion of elastic range, but rubber bands are known to deviate from Hooke's Law. For example, at a stretched and held position the exerted tension force of a rubber band may decrease over an elapsed time as a function of the material property of the rubber band without any change in the applied load, which is a force profile that deviates from Hooke's Law.

The fishing rod frame includes a rod arm and optionally the support arm, the rod arm extending in a first direction from the rotational joint and the support arm extending in a second direction from the rotational joint. In an operational state the rod arm and support arm project from generally opposing lateral aspects of the rotational device, the angle defined between the rod arm and the support arm often ranging from about 120 degrees to 240 degrees when the rod arm and support arm are coupled with co-dependent rotation as components of the rod frame. However, broader or narrower ranges can be accommodated. For example, a broader range of 90 degrees to 270 degrees may be accommodated. Also, a narrower range of 140 degrees to 220 degrees is feasible. In an illustrative example, the rod arm and the support arm may be substantially co-axial.

When the signal arm is present it may be included without the second resilient member. For example, the signal arm may provide an electronic alert indicator without a mechanical alert indicator. The rotational joint and its associated housing provides a convenient chamber to incorporate components of an electronic alert indicator, components such as a power source, a printed circuit board, a switch actuator, and the signal arm provides a convenient structure to mount an alert indicator such as an LED display (visual indicator) or piezoelectric buzzer (audio indicator). However, the signal arm with a mechanical alert indicator provides distinct advantages of providing a more visible alert of fish strike action without requiring dependence on a power source such as a battery or a solar cell. When present, the signal arm will be oriented above the rotational joint and thus provides ground clearance and a distinct advantage over the horizontal sprawl of conventional tip-up fishing devices.

The base arm will typically provide a vertical clearance from a ground or base surface and this clearance provides a distinct advantage over the horizontal sprawl of conventional tip-up fishing devices. Therefore, the base arm will often have a vertical dimension or longitudinal dimension that is greater than the largest horizontal dimension of a foot disposed at the distal end of the base arm. In other examples, the base arm can have a vertical dimension or longitudinal dimension that is greater than 1.5 times the largest horizontal dimension of a foot disposed at the distal end of the base arm. In still other examples, the base arm can have a vertical dimension or longitudinal dimension that is greater than double the largest horizontal dimension of a foot disposed at the distal end of the base arm.

The vertical shaft includes the base arm and optionally the signal arm, the base arm extending in a third direction from below the rotational joint and the signal arm extending in a fourth direction from above the rotational joint, the angle between the base arm and the signal arm ranging from about 130 degrees to about 230 degrees.

The base arm of the device may be configured with a distal end as desired to provide a foot or feet for a free standing implementation for many types of climates and fishing activity, or may be configured with a spear or spike at the distal end to insert the base arm into a ground or base by piercing the ground or base surface. The distal end of the base arm may also be configured with a foot with apertures to receive fasteners for fastening the foot to a base surface, such as a boat or dock surface. The base arm in general, and more specifically the distal half of the base arm may be configured as desired to be mounted, attached, tethered, and the like to a base surface.

Observable structural appearance of the assembled pivoting fishing rod may not define boundary of the base arm, signal arm, rod arm and support arm. The proximal end and distal end of each arm is defined by proximity to the rotational joint—the proximal end being at the rotational joint and the distal end being furthest away from the rotational joint. Considering the assembly without a signal arm as an illustrative example, if the rotational joint is visually observed to be mounted at an end of a column structure extending between the rotational joint and a base surface then the proximal end is self-evident as being the end of the column structure relatively closer to the rotational joint and the distal end is self-evident as being the end of the column structure relatively closer to the base surface. However, in a related comparative example, if the rotational joint is visually observed to be mounted equidistant within the same column structure such that the column structure appears to be identical as it projects in opposing directions from the rotational joint, then the proximal end of the base arm does not coincide with an end of the column structure and rather the base arm ends at the rotational joint, the base arm thus extending between the rotational joint and the base surface and the proximal end of the base arm has a central location within the column structure; and, the portion of the column structure projecting from the rotational joint in an opposing direction is neither a base arm nor a signal arm (as this example excludes a signal arm) but rather an accessory arm that may have no function (ie., providing an aesthetic only) or may have any desired function such as increasing stabilization of the rotational joint or functioning as an additional support arm in a first resilient member attachment point configuration of the first resilient member linking a first attachment point on the additional support arm to a second attachment point on the rod arm. In another illustrative example, consider the assembly without the first resilient member linking the support arm to the base arm as shown in FIG. 1 and the first resilient member applying a compression force and linked between the base arm to the rod arm instead; in this example the support arm is no longer a support arm, the rod arm maintains its proximal end unchanged as shown in the Figures and the support arm is now an accessory arm that may have no function (ie., providing an aesthetic only) or may be configured for any desired function.

The brake and reel interaction can be configured with any suitable mechanism that permits the brake to engage the reel in a brake position when a first load is applied to the rod arm prior to a fish strike and to disengage the reel to allow rotation of the reel in a released position when a second load is applied to the rod arm upon or during a fish strike, the second load being greater than the first load. When the fishing rod device includes a signal arm having a threshold angular position of the rod arm for triggering an alert indicator, the range of angular positions of the rod arm corresponding to the reel in a released position for free rotation is the third range of angular positions. But, when the signal arm is optional the range of angular positions of the rod arm corresponding to the reel in a released position for free rotation can be considered the second range of angular positions.

The pivoting fishing rod device with the automated brake and reel combination includes: a fishing rod frame pivotally coupled to a base arm on a first rotational joint; the fishing rod frame comprising a rod arm; rotation of the rod arm relative to the base arm provided on an axis of rotation defined by the rotational joint; a reel rotationally coupled to the base arm on a second rotational joint; a brake mounted to the base arm, the brake comprising an actuator handle, the actuator handle communicative with a first resilient member biasing the brake to engage the second rotational joint to maintain the reel in a brake position, the first resilient member biasing the actuator handle to maintain a first linear position; and an actuating surface of the actuator handle positioned to abut the rod arm at a first angular position of the rod arm corresponding to a first load applied to the rod arm, the first load less than a predetermined threshold load for relieving stress on the rod arm; the rod arm at a second angular position corresponding to a second load applied to the rod arm, the second load greater than the predetermined threshold load for relieving stress on the rod arm, an interior angle of the rod arm with the base arm being greater at the first angular position than the second angular position; the rod arm in the second angular position moving the actuating handle from a first linear position to a second linear position to disengage the brake from the second rotational joint to allow rotation of the reel in a release position.

The reel rotates relative to the base arm on an axis of rotation defined by the second rotational joint, the axis of rotation substantially perpendicular to the longitudinal axis of the base arm, optionally visual indicia or visual surface features such as reflective posts presented on a visible exterior surface of the reel. The actuator handle may be positioned at or near a proximal end of the base arm, positioned either at, above or below the proximal end of the base arm. The actuator handle may be mounted in a slot formed in the housing of the base arm. The second rotational joint may include a reel shaft co-axial with and connected to the reel rotationally mounted to the base arm, the reel shaft received through a bore formed in the housing of the base arm, the reel shaft connected to a sprocket positioned inside the housing of the base arm. In an example of the brake mechanism, the actuator handle is connected to a 3-bar pivoting linkage that terminates with a gripper, the gripper preventing rotation of sprocket when engaging the sprocket. The 3-bar pivoting linkage may include a plunger bar, a first end of the plunger bar connected to the actuator handle and a second end of plunger bar pivotally coupled to a first end of a swing bar, a middle portion of the swing bar pivotally coupled to the interior housing of base arm, and a second end of the swing bar pivotally coupled to a first end of a lock bar, a second end of the lock bar mounting the gripper. In another example of the brake mechanism, the actuator handle is connected to a plunger bar and a gripper is mounted on a distal half of the plunger bar, optionally the plunger bar includes a bend to orient the gripper to engage a distal portion of the sprocket. In a further example of the brake mechanism, a retention bushing can be connected to an inside surface of the housing of the base arm, the retention bushing slidably receiving the plunger bar, and constraining a motion of the plunger bar to a translation degree of freedom. In a still further example, the brake mechanism may include a first flange projecting circumferentially from the retention bushing, the first flange cooperating with a circumferentially projecting second flange formed on the actuator handle to hold the first resilient member mounted on plunger bar between the first and second flanges. The circumferentially projecting second flange may be formed at an end of actuator handle at a fixed joint with the plunger bar. The first resilient member may be selected or adapted to produce a compressive counterbalance force as the interior angle between the rod arm and the base arm decreases. The first resilient member may be selected to be a coil spring.

The automated brake and reel combination provides a distinct benefit of relieving load stress when load stress is greater than a predetermined load level.

Directional terms may be used to describe features of the pivoting fishing rod device. Directional terms vertical, horizontal, above, below, top, bottom, up, down, upper, lower are intended to reference directions when the pivoting fishing rod device is oriented as it would be in an operational state. Directional terms proximal and distal do not require visual orientation of the device as it would be in an operational state, as the terms proximal and distal are internally references to the rotational joint coupling the rod frame to the base arm. Comparing two points on the same arm a proximal point is relatively closer to the center of the rotational joint and a distal point is relatively farther from the center of the rotational joint. Directional terms proximal and distal may be used to define a range of location along each arm, again keeping the center of the rotational joint as an internal reference. For example, dividing an arm into two sections provides a proximal half and a distal half; dividing into three sections provides a proximal third, an intermediate third, and a distal third; dividing into four sections provides a proximal fourth, an intermediate proximal fourth, an intermediate distal fourth, and a distal fourth; dividing into five sections provides a proximal fifth, an intermediate proximal fifth, an intermediate central fifth, an intermediate distal fifth, and a distal fifth. The term substantially is used to approximate directional relationships such as perpendicular, parallel, co-axial, and the like, with substantially generally indicating a tolerance of +/−10 degrees, and less typically +/−5 degrees.

Embodiments described herein are intended for illustrative purposes without any intended loss of generality. Still further variants, modification and combinations thereof are contemplated and will be recognized by the person of skill in the art. Accordingly, the foregoing detailed description and accompanying drawings are not intended to limit scope, applicability, or configuration of claimed subject matter.

What is claimed is:

1. A pivoting fishing rod device comprising:
  a fishing rod frame pivotally coupled to a base arm on a rotational joint;
  the fishing rod frame comprising a rod arm and a support arm;
  rotation of the fishing rod frame relative to the base arm provided on an axis of rotation defined by the rotational joint, the rod arm coupled to the support arm so that the rotation of the rod arm and the support arm is co-dependent;

a first resilient member coupled to a first attachment point mounted on the base arm and a second attachment point mounted on the support arm, the first resilient member configured to produce a tension counterbalance force as a distance between the first attachment point and the second attachment point increases;

a signal arm projecting from the rotational joint and maintaining a fixed angle relative to the base arm, the signal arm comprising a flag pole and a flag slidably mounted on the flag pole, the flag reversibly captured in a captured position at or near a proximal end of the signal arm, the flag biased towards a distal end of the signal arm by a second resilient member, the flag released from the captured position at a predetermined threshold angular position of the rod arm, wherein the second resilient member is coupled to a third attachment point at or near a distal end of the signal arm and a fourth attachment point mounted on the flag, and wherein the flag comprises a pole sleeve and a display portion extending from the pole sleeve, the pole sleeve slidably mounted on the flag pole.

2. The device of claim 1, further comprising a trigger arm coupled to the fishing rod frame, the trigger arm engaging the flag in the captured position, and releasing the flag from the captured position at the predetermined threshold angular position of the rod arm.

3. The device of claim 1, wherein the base arm and the signal arm are substantially co-axial.

4. The device of claim 1, wherein the rod arm and the support arm are substantially co-axial.

5. The device of claim 1, wherein the rod arm is bound by a proximal end projecting from the rotational joint and a distal end with an eyelet disposed on the rod arm closer to the distal end than the proximal end, the eyelet configured for receiving a fishing line.

6. The device of claim 1, wherein the first and second attachment points are located near the rotational joint and provide a mechanical advantage for the counterbalance force that is less than 1.

7. The device of claim 1, wherein the first resilient member is an elastic band.

8. The device of claim 1, wherein the rod arm and the support arm are integrated in the fishing rod frame.

9. The device of claim 8, wherein the fishing rod frame is reversibly mounted to the rotational joint.

10. A pivoting fishing rod device comprising:
a fishing rod frame pivotally coupled to a base arm on a first rotational joint;
the fishing rod frame comprising a rod arm;
rotation of the rod arm relative to the base arm provided on an axis of rotation defined by the first rotational joint;
a reel rotationally coupled to the base arm on a second rotational joint;
a brake mounted to the base arm, the brake comprising an actuator handle, the actuator handle communicative with a first resilient member biasing the brake to engage the second rotational joint to maintain the reel in a brake position, the first resilient member biasing the actuator handle to maintain a first linear position;
an actuating surface of the actuator handle positioned to abut the rod arm at a first angular position of the rod arm corresponding to a first load applied to the rod arm, the first load less than a predetermined threshold load for relieving stress on the rod arm;
the rod arm at a second angular position corresponding to a second load applied to the rod arm, the second load greater than the predetermined threshold load for relieving stress on the rod arm, an interior angle of the rod arm with the base arm being greater at the first angular position than the second angular position;
the rod arm in the second angular position moving the actuator handle from the first linear position to a second linear position to disengage the brake from the second rotational joint to allow rotation of the reel in a release position.

11. The device of claim 10, wherein the actuator handle is positioned at or near a proximal end of the base arm.

12. The device of claim 11, wherein the actuator handle is mounted in a slot formed in a housing of the base arm.

13. The device of claim 10, wherein the second rotational joint comprises a reel shaft co-axial with and connected to the reel rotationally mounted to the base arm, the reel shaft received through a bore formed in a housing of the base arm, the reel shaft connected to a sprocket positioned inside the housing of the base arm.

14. The device of claim 13, wherein the actuator handle is connected to a 3-bar pivoting linkage that terminates with a gripper, the gripper preventing rotation of the sprocket when engaging the sprocket.

15. The device of claim 14, wherein the 3-bar pivoting linkage comprises a plunger bar, a first end of the plunger bar connected to the actuator handle and a second end of plunger bar pivotally coupled to a first end of a swing bar, a middle portion of the swing bar pivotally coupled to the housing of base arm, and a second end of the swing bar pivotally coupled to a first end of a lock bar, a second end of the lock bar mounting the gripper thereon.

16. The device of claim 15, further comprising a retention bushing connected to the housing of the base arm, the retention bushing slidably receiving the plunger bar, and constraining a motion of the plunger bar to a translation degree of freedom.

17. The device of claim 16, wherein a first flange projecting circumferentially from the retention bushing cooperates with a circumferentially projecting second flange formed on the actuator handle to hold the first resilient member mounted on the plunger bar between the first and second flanges.

18. The device of claim 17, wherein the circumferentially projecting second flange is formed at an end of the actuator handle at a fixed joint with the plunger bar.

19. The device of claim 10, wherein the first resilient member is adapted to produce a compressive counterbalance force as the interior angle between the rod arm and the base arm decreases.

20. The device of claim 10, wherein the first resilient member is a coil spring.

* * * * *